US008089961B2

(12) United States Patent
Sahni et al.

(10) Patent No.: US 8,089,961 B2
(45) Date of Patent: Jan. 3, 2012

(54) LOW POWER TERNARY CONTENT-ADDRESSABLE MEMORY (TCAMS) FOR VERY LARGE FORWARDING TABLES

(75) Inventors: Sartaj Sahni, Gainesville, FL (US); Wencheng Lu, Cupertino, CA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 900 days.

(21) Appl. No.: 11/952,289

(22) Filed: Dec. 7, 2007

(65) Prior Publication Data
US 2009/0150603 A1 Jun. 11, 2009

(51) Int. Cl.
H04L 12/56 (2006.01)
(52) U.S. Cl. .......................................... 370/389; 711/108
(58) Field of Classification Search .................. 370/389, 370/392, 254, 235, 352
See application file for complete search history.

(56) References Cited

U.S. PATENT DOCUMENTS

| 6,633,548 | B2 | 10/2003 | Bachmutsky et al. |
| 6,674,660 | B2 | 1/2004 | Shau |
| 6,725,216 | B2 | 4/2004 | Davis et al. |
| 6,765,908 | B1 * | 7/2004 | Chen ........................... 370/392 |
| 6,807,077 | B2 | 10/2004 | Noda et al. |
| 6,988,189 | B1 | 1/2006 | O'Connor et al. |
| 7,002,822 | B2 | 2/2006 | Kang et al. |
| 7,024,516 | B2 | 4/2006 | Lu |
| 7,028,098 | B2 | 4/2006 | Mate et al. |
| 7,062,571 | B1 | 6/2006 | Dale et al. |
| 7,064,971 | B2 | 6/2006 | Shau |
| 7,170,769 | B1 | 1/2007 | Sachan et al. |
| 7,206,249 | B2 | 4/2007 | Khellah et al. |
| 7,356,033 | B2 * | 4/2008 | Basu et al. ..................... 370/392 |
| 7,797,348 | B2 * | 9/2010 | Luk et al. ...................... 707/802 |

(Continued)

FOREIGN PATENT DOCUMENTS
CN 144159 9/2003
(Continued)

OTHER PUBLICATIONS

Lu, Wencheng, et al., "Succinct Representation of Static Packet Classifiers," $12^{th}$ IEEE Symposium on Computers and Communications, pp. 1119-1124, Jul. 1, 2007.

(Continued)

*Primary Examiner* — Dang T Ton
*Assistant Examiner* — Kevin Lee
(74) *Attorney, Agent, or Firm* — Jon A. Gibbons; Fleit Gibbons Gutman Bongini & Bianco PL

(57) ABSTRACT

Ternary content-addressable memories (TCAMs) may be used to obtain a simple and very fast implementation of a router's forwarding engine. The applicability of TCAMs is, however, limited by their size and high power requirement. The present invention provides an improved method and associated algorithms to reduce the power needed to search a forwarding table using a TCAM. Additionally, the present invention teaches how to couple TCAMs and high bandwidth SRAMs so as to overcome both the power and size limitations of a pure TCAM forwarding engine. By using one of the novel TCAM-SRAM coupling schemes (M-12Wb), TCAM memory is reduced by a factor of about 5 on IPv4 data sets and by a factor of about 2.5 on IPv6 data sets; TCAM power requirement is reduced by a factor of about 10 on IPv4 data sets and by a factor of about 6 on IPv6 data sets.

20 Claims, 14 Drawing Sheets 1-bit trie

TCAM

SRAM

U.S. PATENT DOCUMENTS

| | | | |
|---|---|---|---|
| 2002/0131432 | A1 | 9/2002 | Bachmutsky et al. |
| 2002/0147721 | A1 | 10/2002 | Gupta et al. |
| 2003/0026246 | A1* | 2/2003 | Huang et al. ............... 370/352 |
| 2003/0142524 | A1 | 7/2003 | Shau |
| 2004/0100950 | A1 | 5/2004 | Basu et al. |
| 2004/0170041 | A1 | 9/2004 | Huang |
| 2005/0010719 | A1 | 1/2005 | Slavin |
| 2006/0062038 | A1 | 3/2006 | Kang et al. |
| 2006/0078333 | A1 | 4/2006 | Uga et al. |
| 2006/0090039 | A1 | 4/2006 | Jain et al. |
| 2007/0061668 | A1 | 3/2007 | Wickeraad et al. |
| 2007/0088910 | A1 | 4/2007 | Parthasarathy et al. |
| 2007/0297333 | A1* | 12/2007 | Zuk et al. ............... 370/235 |

FOREIGN PATENT DOCUMENTS

| | | |
|---|---|---|
| CN | 1447223 | 10/2003 |
| EP | 1657859 | 5/2006 |
| JP | 2003234762 | 8/2003 |
| JP | 2006005636 | 1/2006 |
| KR | 100653958 B | 11/2006 |

OTHER PUBLICATIONS

Wang, P.C., et al., "Efficient Entry-Reduction Algorithm for TCAM-based IP Forwarding Engine," IEEE Proceedings-Communications, vol. 152, Issue 2, pp. 172-176, Apr. 8, 2005.

International Search Report and Written Opinion dated Apr. 29, 2009 for PCT/US2008/084531.

Akhbarizadeh et al., A TCAM-Based Parallel Architecture for High-Speed Packet Forwarding, IEEE Transactions on Computers, Jan. 2007 pp. 58-72, Issue 1, vol. 56.

Chang, A 2-Level TCAM Architecture for Ranges, IEEE Transactions on Computers, Dec. 2006, pp. 1614-1629, Issue 12, vol. 55.

Kai et al., DPPC-RE: TCAM-Based Distributed Parallel Packet Classification with Range Encoding, IEEE Transactions on Computers, Aug. 2006, pp. 947-961, Issue 8, vol. 55.

Ravikumar et al., EaseCAM: An Energy and Storage Efficient TCAM-Based Router Architecture for IP Lookup, IEEE Transactions on Computers, May 2005, pp. 521-533, Issue 5, vol. 54.

Wang et al., CoPTUA: Consistent Policy Table Update Algorithm for TCAM Without Locking, IEEE Transactions on Computers, Dec. 2004, pp. 1602-1614, Issue 12, vol. 53.

Kai et al., A TCAM-based Distributed Parallel IP Lookup Scheme and Performance Analysis, IEEE/ACM Transactions on Networking, Aug. 2006, pp. 863-875, Issue 4, vol. 14.

Ravikumar et al., TCAM Architecture for IP Lookup Using Prefix Properties, IEEE Micro, Mar.-Apr. 2004, pp. 60-69, Issue 2, vol. 24.

Sahni et al., Data Structures for One-Dimensional Packet Classification Using Most-Specific-Rule Matching, International Journal of Foundations of Computer Science, Jun. 2003, pp. 337, Issue 3, vol. 14.

Tzeng, Routing Table Partitioning for Speedy Packet Lookups in Scalable Routers, IEEE Transactions on Parallel & Distributed Systems, May 2006, pp. 481-494, Issue 5, vol. 17.

Zane et al., Coolcams: Power-Efficient TCAMS for Forwarding Engines, INFOCOM 2003, Twenty-Second Annual Joint Conference of the IEEE Computer and Communications Societies. IEEE, Mar. 3-Apr. 30, 2003, pp. 42-45, vol. 1.

Lin, et al., "A TCAM Index Scheme for IP Address Lookup", Communications and Networking in China, 2006, Chinacom -06, First International Conference on, IEEE, PI, Oct. 1, 2006, pp. 1-5, XP031074707; ISBN: 978-1-4244-0462-9.

European Search Report dated Oct. 19, 2010 for European Application No. EP08860657.

* cited by examiner

```
Algorithm visit(x)
{
    if (count(x)==b){
        if (x does not require a covering prefix) split(x);
        else {
            // x has two children y and z.
            if (count(y)>=count(z)) split(y);
            else split(z);
        }
        return;
    }
    if (count(x)>b){
        // x has two children y and z.
        if (count(y)>=count(z)) split(y);
        else split(z);
        recompute count(x);
        if (count(x)==b)
            split(x); // x contains a prefix
    }
}
```

FIG. 7

Step 1: [Seed the DTCAM buckets]
  Run *feasibleST(T,b)* [n/b] times.
  Each time carve the found *bestST* from T (thereby updating T) and pack *bestST* into a new DTCAM bucket.
  Add a covering prefix to the DTCAM bucket if needed.
  Add a prefix for *bestST* to the ITCAM.

Step 2: [Fill the buckets]
  While T is not empty, repeat Step 3.

Step 3: [Add to a bucket]
  Let B be the DTCAM bucket with the fewest number of forwarding-table prefixes.
  Let s be the number of forwarding-table prefixes in B.
  Run *feasibleST(T,b - s)*.
  Carve the found *bestST* from T (thereby updating T) and pack *bestST* into B.
  Add a covering prefix for *bestST* to the DTCAM bucket if needed.
  Add a prefix for *bestST* to the ITCAM.

Step 4: [Sort DTCAM prefixes]
  Sort the prefixes in each DTCAM bucket into nonincreasing order of length.

FIG. 8

```
Algorithm visit1(x)
{
  // check ST(x)
  if (count(x) <= q && count (x) > bestCount) {
    bestST = ST(x);
    bestCount = count (x);
  }
  // check T - ST(x)
  c = count(root(T)) - count(x);
  if (c <= q && c > bestCount) {
    bestST = T - ST(x);
    bestCount = c;
  }
}
```

FIG. 9

Step 1: [Seed the DTCAM buckets]
Run *feasibleST2(T,b)* [*n/b*] times.
Each time carve the found *best ST* from *T* (thereby updating *T*) and pack *bestST* into a new DTCAM bucket.
Add a covering prefix to the DTCAM bucket if needed.
Add a prefix for *bestST* to the ITCAM.

Step 2: [Fill the buckets]
While there is a DTCAM bucket that is not full and *T* is not empty, repeat Step 3.

Step 3: [Add to a bucket]
Let *B* be the DTCAM bucket with the fewest number of prefixes (including covering prefixes).
Let *s* be the number of prefixes in *B*.
Run *feasibleST(T,b - s)*.
Carve the found *bestST* from *T* (thereby updating *T*) and pack *bestST* into *B*.
Add a covering prefix for *bestST* to the DTCAM bucket if needed.
Add a prefix for *bestST* to the ITCAM.

Step 4: [Use additional buckets as needed]
While *T* is not empty, fill a new DTCAM bucket by making repeated invocations of *feasibleST(T,q)*, where *q* is the remaining capacity of the bucket.
Add ITCAM prefixes as needed.

Step 5: [Sort DTCAM prefixes]
Sort the prefixes in each DTCAM bucket into nonincreasing order of length.

FIG. 10

```
Algorithm visit2(x)
{
  // check ST(x)
  if (no covering prefix is needed for x) d = count(x);
  else d = count (x) + 1;
  if (d <= q && count (x) > bestCount) {
    bestST = ST(x);
    bestCount = count (x);
  }
  // check T - ST(x)
  c = count(root(T)) - count(x);
  if (no covering prefix is needed for root(T)) d = c;
  else d = c + 1;
  if (d <= q && c > bestCount) {
    bestST = T - ST(x);
    bestCount = c;
  }
}
```

| Suffix Count | len(S1) | S1 | next hop of S1 | ... | len(Sk) | Sk | next hop of Sk | unused |

```
Algorithm visit3(x)
{
    if (ST(x) .size < w) return;
    if (ST(x) .size == w) {split (x); return;}
    // ST (x) .size > w
    if (x has only 1 non-null child y) {split (y); return;}
    // x has 2 non-null  children y and z
    if (ST(y) .numB <= ST(z) .numB) {
        split(z);
        recompute ST(x) .size;
        if (ST(x) .size < w) return;
        if (ST(x) .size == w) split (x);
        else split(y);
    }
    else // ST(y) .numB > ST(z) .numB
        this is symmetric to the case ST(y) .numb <= ST(z).numB
}
```
FIG. 14
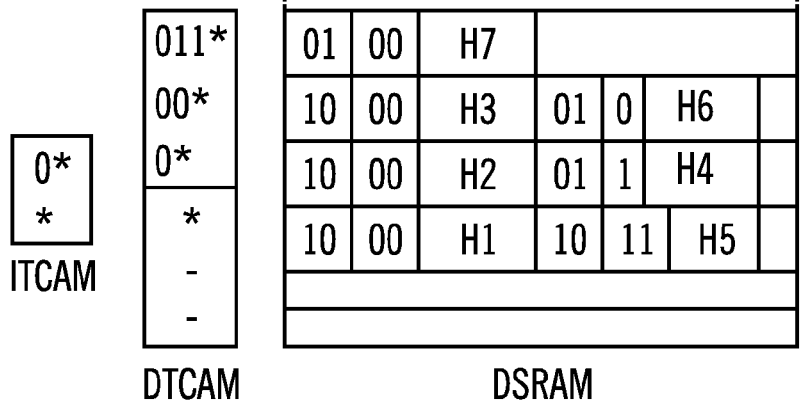
FIG. 15
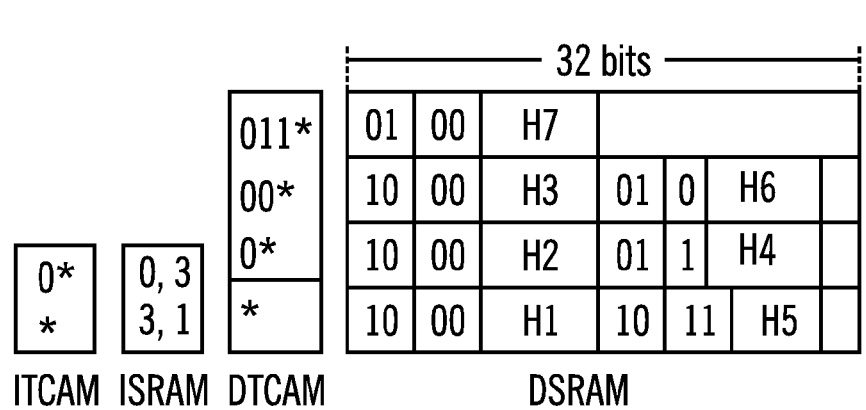
FIG. 16

| Method | TCAM Size | TCAM Power | TCAM Searches | SRAM Accesses |
|---|---|---|---|---|
| Simple | $n$ | $n$ | 1 | 1 |
| 1-1 | $2n+\frac{2n}{b}$ | $\frac{2n}{b}+b$ | 2 | 2 |
| M-1 | $\frac{n}{b}(b+2\log_2 b)$ | $b+\log_2 b(1+\frac{n}{b})$ | 2 | 2 |
| STW | $n/a_1$ | $n/a_1$ | 1 | 1 |
| 1-12Wa | $\frac{2n}{a_1}(1+\frac{1}{b})$ | $b+\frac{2n}{a_1 b}$ | 2 | 1 |
| 1-12Wb | $\frac{n}{a_1}(1+\frac{2}{b})$ | $b+\frac{2n}{a_1 b}$ | 2 | 2 |
| 1-12Wc | $\frac{2n}{a_1}(1+\frac{1}{a_2 b})$ | $b+\frac{2n}{a_1 a_2 b}$ | 2 | 2 |
| 1-12Wd | $\frac{n}{a_1}(1+\frac{2}{a_2 b})$ | $b+\frac{2n}{a_1 a_2 b}$ | 2 | 2 |
| M-12Wa | $\frac{n}{a_1 b}(b+2\log_2 b)$ | $b+\log_2 b(1+\frac{n}{a_1 b})$ | 2 | 2 |
| M-12Wb | $\frac{n}{a_1 b}(b+\log_2 b+\frac{\log_2 b}{a_2})$ | $b+\log_2 b(1+\frac{n}{a_1 a_2 b})$ | 2 | 2 |

FIG. 20

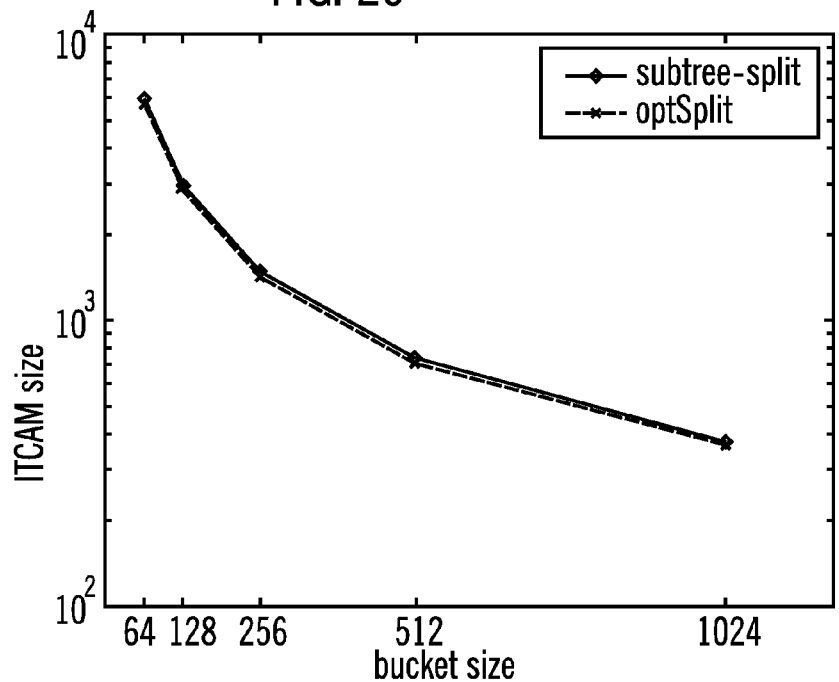

FIG. 21

LOW POWER TERNARY CONTENT-ADDRESSABLE MEMORY (TCAMS) FOR VERY LARGE FORWARDING TABLES

STATEMENT REGARDING FEDERALLY SPONSORED RESEARCH OR DEVELOPMENT

This invention was made with government support, in part, by the National Science Foundation under grant ITR-0326155. The Government has certain rights in this invention.

CROSS-REFERENCE TO RELATED APPLICATIONS

Not Applicable

FIELD OF THE INVENTION

The present invention generally relates to the decoding and to the displaying of audiovisual programs contained in a stream of compressed digital data.

BACKGROUND OF THE INVENTION

Each rule of a packet forwarding table comprises a prefix and a next hop. Packet forwarding is done by determining the next hop associated with the longest prefix in the forwarding table that matches the destination address of the packet to be forwarded. Several solutions for very high-speed longest prefix matching have been proposed for surveys (see the reference M. Ruiz-Sanchez, E. Biersack, and W. Dabbous, *Survey and taxonomy of IP address lookup algorithms*, IEEE Network, 2001, 8-23, (the teachings of which are hereby incorporated by reference in their entirety and hereinafter referred to as "Ruiz") and the reference S. Sahni, K. Kim, and H. Lu, *Data structures for one-dimensional packet classification using most-specific-rule matching*, International Journal on Foundations of Computer Science, 14, 3, 2003, 337-358, (the teachings of which are hereby incorporated by reference in their entirety and hereinafter referred to as "Sahni8"). Among the many proposed solutions to the packet forwarding problem, those employing TCAMs are the simplest and fastest. A TCAM is a fully associative memory in which each bit may be in one of 3 states—0, 1 and don't care. By loading the forwarding table prefixes into the TCAM in decreasing order of prefix length (ties are broken arbitrarily), the TCAM index of the longest matching prefix for any destination address may be determined in one TCAM cycle. Using this index, the word of SRAM can be accessed where the next hop associated with the matching prefix is stored and complete the forwarding task. So, the simplest TCAM solution to packet forwarding requires 1 TCAM search and 1 SRAM access to forward a packet. Two drawbacks of this TCAM solution are (a) an IPV4 forwarding table with n prefixes requires a TCAM that has 32n bits and (b) since each lookup searches the entire 32n-bit TCAM, the power consumption is that for a TCAM of this size.

The reference F. Zane, G. Narlikar and A. Basu, *Cool-CAMs: Power-Efficient TCAMs for Forwarding Engines*, INFOCOM, 2003, (the teachings of which is hereby incorporated by reference in its entirety and hereinafter referred to as "Zane") Several strategies—e.g., the reference R. Panigrahy and S. Sharma, *Reducing TCAM power consumption and increasing throughput*, IEEE Symposium on High Performance Interconnects Hot Interconnects, 2002 (the teachings of which are hereby incorporated by reference in their entirety, (hereinafter referred to as "Panigrahy"), the reference Zane, the reference K. Zheng, C. Hu, H. Liu, and B. Liu, *An ultra high throughput and power efficient TCAM-based IP lookup engine*, IEEE INFOCOM, 2004 (the teachings of which are hereby incorporate by reference in their entirety and hereinafter referred to as "Zheng"), the reference H. Lu, *Improved Trie Partitioning for Cooler TCAMs*, IASTED International Conference on Advances in Computer Science and Technology, 2004 (the teachings of which is hereby incorporated by reference in its entirety and herein after referred to as "HaLu")—have been proposed to reduce TCAM power significantly by capitalizing on a feature in contemporary TCAMs that permits one to select a portion of the entire TCAM for search. The power consumption now corresponds to that for a TCAM whose size is that of the portion that is searched. Using the example of the reference Zane, suppose in this example there is a TCAM with a capacity of 512K prefixes and that the TCAM has a block size of 6K. So, the total number of blocks is 64. The portion of the total TCAM that is to be searched is specified using a 64-bit vector. Each bit of this vector corresponds to a block. The 1s in this vector define the portion (subtable) of the TCAM that is to be searched and the power required to search a TCAM subtable is proportional to the subtable size. While it is not required that a subtable be comprised of contiguous TCAM blocks, in this example embodiment of the present invention the TCAM blocks are contiguous. The term bucket is used to refer to a set of contiguous blocks. Although, in the example of the reference Zane the size of a bucket is a multiple of 8K prefixes, it is important to note that bucket sizes are required only to be integer.

The reference Zane partition the forwarding table into smaller subtables (actually, buckets) so that each lookup requires 2 searches of smaller TCAMs. Their method, however, increases the total TCAM memory that is required. Halu has proposed an improved table partitioning algorithm for TCAMs. In the reference by M. Akhbarizadeh, M. Nourani, R. Panigrahy and S. Sharma, *A TCAM-based parallel architecture for high-speed packet forwarding*, IEEE Trans. on Computers, 56, 1, 2007, 58-2007 (the teachings of which are hereby incorporated by reference in its entirety, hereinafter referred to as "Akbar") proposes an alternative TCAM architecture that employs multiple TCAMs and multiple TCAM selectors. The routing table is distributed over the multiple TCAMs, the selectors decide which TCAM is to be searched. The architecture of Akhbar is able to determine the next-hop for several packets in parallel and so achieves processing rates higher than those achievable by using a single pipeline architecture such as the one proposed by the reference Zane. The proposal of the reference Zane, however, has the advantage that it can be implemented a commercial network processor board equipped with a TCAM and an SRAM (for example, Intel's IXP 3000 network processor supports a TCAM and up to 4 SRAMs, no customized hardware support is required) whereas that of Akhbar cannot.

According what is needed is a method and system to over come the problems encountered in the prior art and to optimize the displaying of the pictures at a selected speed according to the performance of the data stream processing chain, from the extracting of the data from the hard disk, up to display.

SUMMARY OF THE INVENTION

Ternary content-addressable memories (TCAMs) may be used to obtain a simple and very fast implementation of a router's forwarding engine. The applicability of TCAMs is, however, limited by their size and high power requirement. The reference Zane proposed a method and associated algorithms to reduce the power needed to search a forwarding table using a TCAM. The present invention improves on both the algorithms proposed by them. Additionally, the present invention teaches how to couple TCAMs and high bandwidth static-random-access-memories (SRAMs) so as to overcome both the power and size limitations of a pure TCAM forwarding engine. By using one of the novel TCAM-SRAM coupling schemes (M-12Wb), the present invention reduces TCAM memory by a factor of about 5 on IPv4 data sets and by a factor of about 2.5 on IPv6 data sets; TCAM power requirement is reduced by a factor of about 10 on IPv4 data sets and by a factor of about 6 on IPv6 data sets. These comparisons are with respect to the improved TCAM algorithms of the present invention developed for the strategies of the reference Zane, and the reference Halu. The stated improvements come at the cost of increasing SRAM requirement by a factor 2.5 for IPv4 data and a factor of 5 for IPv6 data. This cost is unimportant given that SRAMs are relatively quite cheap and have much less power requirement. For another of the novel TCAM-SRAM coupling schemes (1-12Wc), the TCAM memory and power reduced by factors of about 4 and 12 for IPv4 data sets, respectively; and by factors of about 2 and 10 for IPv6 data sets. The SRAM required, however, increased by factors of 3 and 7, respectively. These improvement come with no loss in the time (as measured by the number of TCAM searches and SRAM accesses) to do a lookup.

In one embodiment, the computer program product, system and method for routing a packet includes storing, using a suffix node format, a subtree of an ordered tree data structure into a given word size of random-access memory (RAM). In one embodiment, the suffix node format includes a suffix count, a suffix length and a suffix of a next hop for packet routing. The method stores indices to the subtree in RAM into at least one ternary content-addressable memory (TCAM). A packet is received with at least one destination address. A lookup in the TCAM is performed using a portion of the destination address to retrieve an index value. The RAM is indexed to retrieve the subtree corresponding to the index value. A next action on the packet is determined using the subtree, which has been retrieved. The next action includes finding the next hop for forwarding the packet and classifying the packet such as whether the packet is an intrusion packet.

In one embodiment, the subtree is a partition including one or more nodes of a trie representing prefixes for destination addresses.

In another embodiment, the RAM is SRAM and the given word size is a positive integer multiple n of 8 bits.

In another embodiment, the subtree of the ordered tree data structure is stored in a logical word that is distributed over two or more physical RAMs.

The present invention provides another embodiment, a method for routing a packet that includes storing, using a suffix node format, a subtree of an ordered tree data structure into a given word size of random-access memory (RAM). A first portion of indices is stored to the subtree in RAM into at least a first portion of at least one ternary content-addressable memory (TCAM), wherein the first portion of the TCAM is logically divided into a given number of groupings of subtree splits. A second portion stores indices to the indices in the first portion of the TCAM into at least a second portion of the TCAM. A packet is received with at least one destination address. The destination address is used to perform a lookup in the second portion of the TCAM to retrieve a first index value to be used with the first portion of the TCAM. A combination of the first index value and the size of groupings of subtree splits is used to determine a location of one of the groupings of subtree splits to be searched with the destination address to retrieve a second index value into the RAM. The RAM is indexed to retrieve the subtree corresponding to the second index value. A next action to perform on the packet is determined using the subtree which has been retrieved.

In another embodiment the size of groupings of subtree splits is b and each grouping of the subtree split has at least [b/2] entries where b>1 is a specified bound on the size of groupings and wherein the groupings are created using an optimal splitting algorithm.

In another embodiment the RAM is logically partitioned into a first portion with prefixes for determining a location of one of the groupings of subtree splits in the first portion of TCAM to be searched and a second portion for storing information to determine the next action to perform on the packet.

In another embodiment, the RAM is logically partitioned into a first portion with suffix nodes used to determine a location of one of the groupings of subtree splits in the first portion of TCAM and a second portion for storing suffix nodes to determine the next action to perform on the packet. The buckets in the first portion of the TCAM can be variable in size. Also this can be enhanced by placing one or more forwarding-table prefixes in the subtree into the first portion of the TCAM by packing several subtries carved from an original 1-bit trie into a single one of the grouping of subtree splits.

In yet another embodiment, a dynamic programming carving algorithm is used to define a partial subtree, PT(N), to be a feasible subtree of T that is rooted at N, where opt(N,b,p) is a minimum number of suffix nodes in any carving of ST(N) when all but one of the subtrees represented by the suffix nodes are carved out of ST(x), a partial subtree PT(N) is left. such that since every suffix node contains at least 1 forwarding-table prefix, every carved subtree, other than PT(N), contains at least 1 forwarding-table prefix.

The foregoing and other features and advantages of the present invention will be apparent from the following more particular description of the preferred embodiments of the invention, as illustrated in the accompanying drawings.

It finds applications in routers, hubs and network appliances, and more.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 7 is a code fragment illustrating a visit function for optimal subtree splitting, according to the present invention.

FIG. 8 is a high level flow of the PS1, according to the present invention.

FIG. 9 is a code fragment illustrating a visit function for feasibleST as used by PS1, according to the present invention.

FIG. 10 is a high level flow of the PS2, according to the present invention.

FIG. 14 is a code fragment illustrating a visit function for subtree carving heuristic, according to the present invention.

FIG. 15 is a layout for the 7-prefix forwarding table example of FIG. 1 illustrating 1-12Wa with fixed-size DTCAM buckets, according to the present invention.

FIG. 16 is a layout for the 7-prefix forwarding table example of FIG. 1 illustrating 1-12Wb with variable-size DTCAM buckets, according to the present invention.

FIG. 20 is a table illustrating a comparison of worst-case TCAM memory and power required, according to the present invention.

FIG. 21 is a plot illustrating a total ITCAM size with wide SRAMs for AS1221, according to the present invention.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others.

In general, unless otherwise indicated, singular elements may be in the plural and vice versa with no loss of generality.

The present invention improves upon the router-table partitioning algorithms of the reference Zane and the reference Halu. These algorithms may be used to partition router tables into fixed size blocks as is required by the architecture of the reference Akhbar as well. Additionally, described is how to couple TCAMs and wide SRAMs so as to search forwarding tables whose size is much larger than the TCAM size with no loss in time and with power reduction. The algorithms and techniques of the present invention are implementable using a commercial network processor board equipped with a TCAM and multiple SRAMs. The following is a brief overview of the various sections in described for the present invention. First a brief back ground of related work is discussed in the section entitled "Background of Prefix and TCAM". Next, in the section entitled "Subtree" the development of an example algorithm used to perform optimal subtree splits is described and in the section entitled "Postorder Split" a heuristic for post order split is described. Methods to efficiently search forwarding tables whose size is larger than the TCAM size are described in the sections entitled "Simple TCAM with Wide SRAM" and "2-Level TCAM with Wide SRAM". A qualitative comparison of the methods to reduce TCAM power and increase the size of the forwarding table that may be search is done in the section entitled "A Comparison" and an experimental evaluation of the present invention is presented in the section entitled "Experimental Results".

Background of Prefix and TCAM

Figures 1, 2:
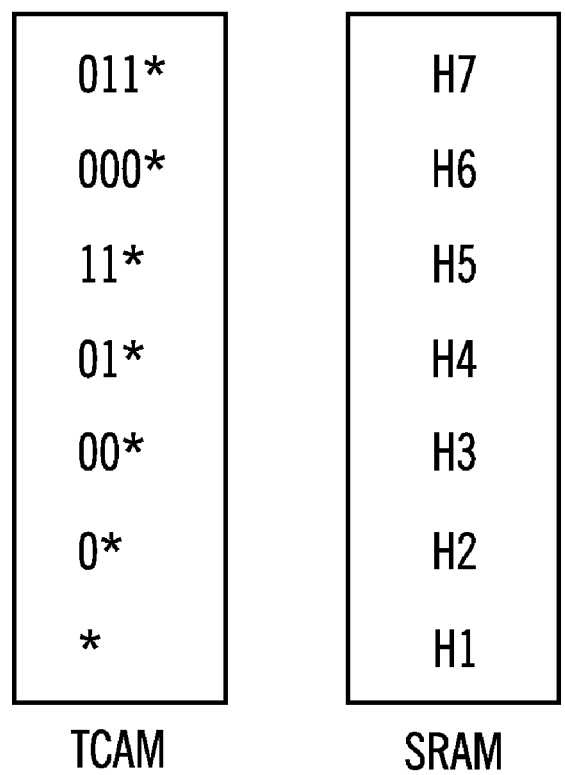
FIG. 1 is an illustration of an example 7-prefix forwarding table.
FIG. 2 is an illustration of a simple TCAM organization for FIG. 1.
Figure 3:
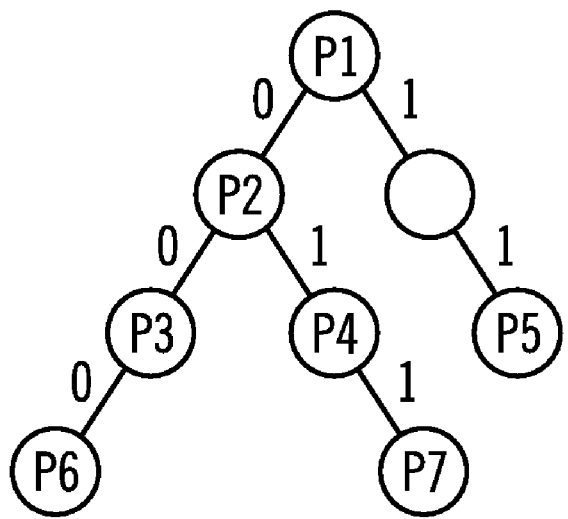
FIG. 3 is an illustration of an 1-bit trie for 7-prefix example of FIG. 1.

FIG. 1 gives an example 7-prefix forwarding table. FIG. 2 shows a simple TCAM organization for this forwarding table. In this organization, the 7 prefixes are stored in the TCAM in decreasing order of prefix length and the next hops are stored in corresponding words of an SRAM. For this example, an assumption is made that the TCAM and SRAM words are indexed beginning at 0. Other non-zero beginning index values are within the true scope and spirit of the present invention. For example, given a packet whose destination address begins with 010. The longest matching prefix is P4. A TCAM search for the destination address returns the TCAM index 3 for the longest matching prefix. Accessing word 3 of the SRAM yields H4 as the next hop for the subject packet. To reduce the power consumed by the TCAM search, the reference Zane proposes partitioning the TCAM into an index TCAM (ITCAM) and a data TCAM (DTCAM). The DTCAM is comprised of several buckets of prefixes. Each lookup requires a search of the ITCAM, a search of 1 bucket of the DTCAM, and 2 SRAM accesses. The reference Zane proposes two methods—subtree split and postorder split—to partition the forwarding table prefixes into DTCAM buckets. Both methods start with the 1-bit trie representation of the prefixes in the forwarding table. FIG. 3 shows the 1-bit trie for the 7-prefix example of FIG. 1.

Figure 4:
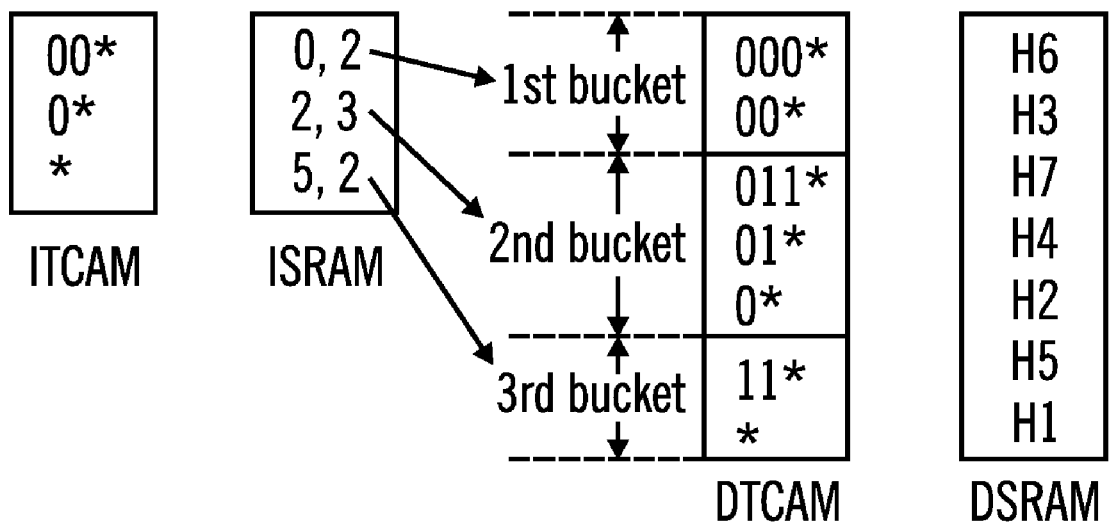
FIG. 4 is a block diagram of an example 2-level TCAM organization using subtree split.

In subtree split, the prefixes are partitioned into variable-size buckets. All but one of the buckets contain between $$\left[\frac{b}{2}\right]$$

and b prefixes, where b>1 is a specified bound on the bucket size. The remaining bucket contains between 1 and b prefixes. The partitioning is accomplished by performing a postorder traversal of the 1-bit trie. During the visit operation, the subtree rooted at the visited node v is carved out if it contains at least $$\left\lceil \frac{b}{2} \right\rceil$$

prefixes and if the subtree rooted at its parent (if any) contains more than b prefixes. The prefixes in the carved out subtree are mapped into a DTCAM bucket in decreasing order of length. A covering prefix (if needed) is added to the DTCAM bucket. The covering prefix for v is the longest-length forwarding table prefix that matches all destination addresses of the form P*, where P is the prefix defined by the path from the root of the 1-bit trie to v. Under the assumption that * is a forwarding table prefix, every v has a well-defined covering prefix. The DTCAM bucket that results when the subtree rooted at v is carved out of T needs a covering prefix if there is a destination addresses d of the form P* for which the ITCAM lookup is followed by a lookup in this DTCAM bucket and this DTCAM bucket has no matching prefix for d (equivalently, if there is no prefix on at least one downward path from v in the 1-bit trie). The covering prefix is the prefix in the nearest ancestor of v that contains a prefix. The path from the root to v defines a prefix that is added to the ITCAM. ITCAM prefixes are stored in the order they are generated by the postorder traversal. FIG. 4 shows the ITCAM, DTCAM and the 2 SRAMs (ISRAM and DSRAM) for the 7-prefix example. For each ITCAM prefix, the corresponding ISRAM entry points to the start of the DTCAM bucket that generated that prefix and for each DTCAM prefix, the corresponding DSRAM entry is the next hop for that prefix. Since DTCAM buckets are of variable size, ISRAM entries will need also to store the size of the bucket pointed to. To do a lookup, the ITCAM is searched for the first prefix that matches the destination address. The corresponding ISRAM entry points to the DTCAM bucket that is to be searched next. So, by doing 2 TCAM searches and 2 SRAM accesses, the next hop for the packet is determined.

For a forwarding table with n prefixes, the number of ITCAM entries Is at most $$\left\lceil \frac{2n}{b} \right\rceil$$

and each bucket has at most a b+1 prefixes (including the covering prefix). Assuming that TCAM power consumption is roughly linear in the size of the TCAM being searched, the TCAM power requirement is approximately $$\left\lceil \frac{2n}{b} \right\rceil + b + 1,$$

which is minimized when b=√2n. The minimum power required is 2√2n+1. At this minimum, the total TCAM memory required is that for at most 2√2n+n prefixes (including covering prefixes; each DTCAM bucket has at most 1 covering prefix). This compares with a power and memory requirement of n for the simple TCAM solution of FIG. 2. When n=8*10⁴, for example, the minimum power required by the 2-level TCAM solution of FIG. 4 is 801 and TCAM memory for 80,800 prefixes is required. In contrast, the simple solution of FIG. 2 has a power and memory requirement of 80,000.

Figure 5:
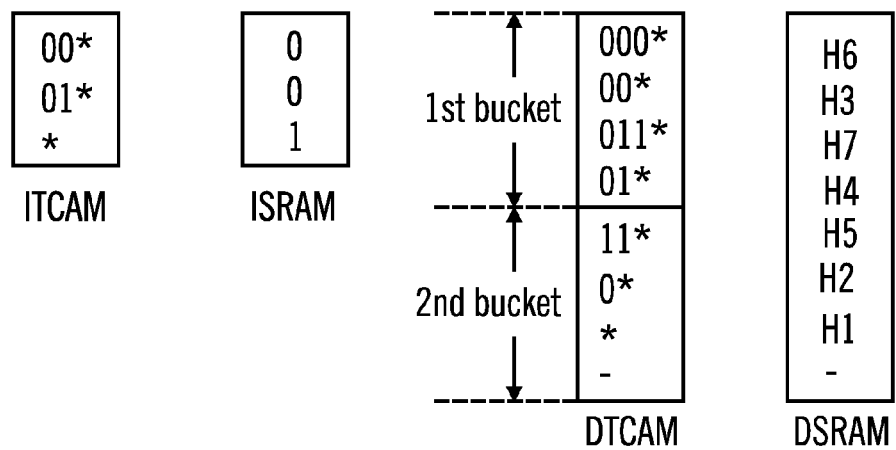
FIG. 5 is a block diagram of an example 2-level TCAM organization using postorder split.

All but at most one of the buckets generated by postorder split of the reference Zane, contain b forwarding table prefixes (plus up to W covering prefixes W≦32 for IPv4, where W is the length of the longest forwarding-table prefix); the remaining bucket has fewer than b forwarding-table prefixes (plus up to W covering prefixes). All buckets may be padded with null prefixes so that, for all practical purposes, they have the same size. The partitioning is done using a postorder traversal as in the case of subtree splitting. However, now, in this example the prefixes of several subtrees are packed into the same bucket so as to fill each bucket. Consequently, the ITCAM may have several prefixes for each DTCAM bucket; one prefix for each subtree that is packed into the bucket. Note also that a bucket may contain up to 1 covering prefix for each subtree packed into it. FIG. 5 shows the ITCAM, ISRAM, DTCAM, and DSRAM configurations for the 7-prefix example of FIG. 1.

The reference Zane have shown that the size of the ITCAM is at most $$(w+1)*\left\lceil \frac{n}{b} \right\rceil$$

and a bucket may have up to b+W prefixes (including covering prefixes). Halu has developed an alternative algorithm to partition into equal-size buckets. His algorithm, results in an ITCAM that has at most $$\left\lceil \frac{n}{b} \log_2 b \right\rceil$$

ITCAM prefixes and each DTCAM bucket has at most b+⌈log₂ b⌉ prefixes (including covering prefixes); each bucket except possibly one has exactly b forwarding-table prefixes (plus up to ⌈log₂ b⌉ covering prefixes). Since log₂ b<W, in practice, HaLu's algorithm results in smaller ITCAMs as well as reduced total space for the DTCAM. When using the partitioning algorithm of Halu, power is minimized when, b≈√n. At this value of b, the total TCAM memory required is that for at most n+1.5√nlog₂n prefixes (including covering prefixes) and the TCAM power required is √n(0.5 log₂ n+1)+0.5 log₂ n.

In a 1-1 2-level TCAM, two levels of TCAM (ITCAM and DTCAM) are employed and each ITCAM prefix corresponds to a different DTCAM bucket. In a many-1 2-level TCAM several ITCAM prefixes may correspond to the same DTCAM bucket. Subtree splitting results in a 1-1 2-level TCAM while postorder splitting results in a many-1 2-level TCAM. In either case, a lookup requires 2 TCAM searches and 2 SRAM accesses.

When postorder split is used, the number of DTCAM buckets is $$\left\lceil \frac{n}{b} \right\rceil.$$

Under the assumption that the number of ITCAM prefixes is small, postorder split achieves better power management than does subtree split because the variation in DTCAM size is smaller when using a postorder split (bucket size varies from b+W or b+⌈log₂ b⌉ rather than when subtree split $$\left( \text{bucket size varies from } \left\lceil \frac{b}{2} \right\rceil + 1 \text{ to } b+1 \right)$$

is used.

Subtree Split

Figure 6:
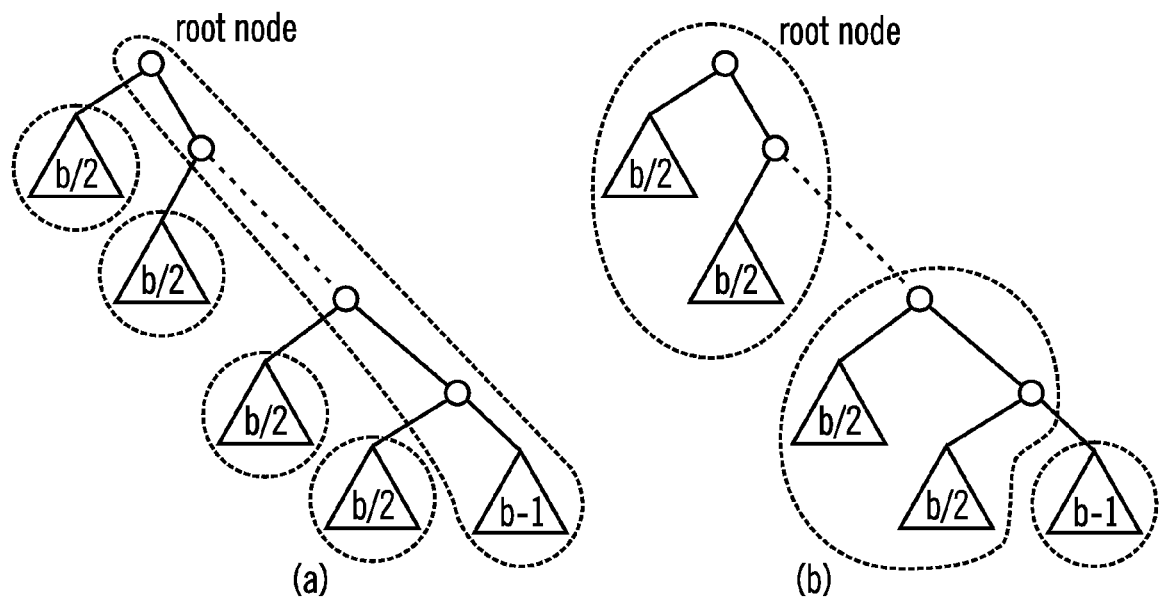
FIG. 6(a) and FIG. 6(b) illustrate a bad example for subtree split of the reference Zane.

The subtree split algorithm of the reference Zane is suboptimal; that is it does not partition a 1-bit trie into the smallest number of subtrees that have at most b prefixes each. In fact, the algorithm of the reference Zane may generate almost twice the optimal number of subtrees and hence buckets and ITCAM prefixes. To see this consider the 1-bit trie of FIG. 6(a). In this, b is even, the rightmost subtrie has b−1 prefixes and each of the left subtries has b/2 prefixes. Let h−1 be the total number of left subtries (i.e., subtries with b/2 prefixes each). FIG. 6(a) shows the bucketing obtained by the algorithm of the reference Zane. One bucket has b−1 prefixes and the remainder have b/2 prefixes each. The total number of buckets (and hence ITCAM prefixes) is h. FIG. 6(b) shows an optimal partitioning into a 1-1 2-level TCAM. The number of buckets is h/2+1. Note that since each bucket has at least $$\left\lceil \frac{b}{2} \right\rceil,$$

prefixes, 2 is an upper bound on the ratio of the number of buckets generated by the subtree split algorithm of the reference Zane and the optimal number of buckets.

THEOREM 1: Let m be the number of buckets (and hence ITCAM prefixes) generated by the subtree split algorithm of the reference Zane. Let m* be the number of buckets in an optimal subtree split. m/m*<2 and this bound is best possible.

Optimal subtree splits are constructed using the visit algorithm of FIG. 7 in conjunction with a postorder traversal of the 1-bit trie T for the forwarding table. In the visit algorithm of FIG. 7, b is the maximum number of prefixes (including the covering prefix (if any)) that may be stored in a DTCAM count(x) is the number of prefixes stored in the ST(x), of T that is rooted at node x of T and split(x) removes ST(x) from T. The algorithm is modified easily to the case when b is the maximum number of forwarding-table prefixes that may be stored in a bucket. This is the definition of b used in the reference Zane. Note that nodes of T store only prefixes that are in the forwarding table. When ST (x is removed (split, carved) from T, the prefixes stored in ST(x) together with a covering prefix for ST(x) (if needed) are stored in a bucket of the DTCAM and the prefix corresponding to the path from the root of T to x is added to the ITCAM. Note that following the execution of split(x),count (r)) decreases as ST(r) has fewer nodes for every r that is an ancestor of x. Note also that whenever a subtree is split (removed, carved) from T, the subtree contains at most b prefixes and that when the subtree contains b prefixes, no covering prefix is needed in the DTCAM bucket that results. Hence, no bucket is assigned more than b prefixes (including the covering prefix (if any)). Let optSplit denote the subtree split algorithm that results from using the visit algorithm of FIG. 7 in conjunction with a postorder traversal of the 1-bit trie for a forwarding table.

THEOREM 2: Algorithm optSplit minimizes the number of DTCAM buckets and hence minimizes the number of ITCAM prefixes.

PROOF: First, it is observed that when a node x is visited, count(w)<b for every node w in ST(x). To see this, note that in a postorder traversal, all nodes in ST(x) are visited before x is visited. Hence, if w∈ST(x) at the time x is visited, ST(w) was not carved out of the 1-bit trie T when w was visited and count(w) has not changed since the time w was visited and x is visited. An examination of the visit algorithm of FIG. 7 reveals that count(w)<b following the execution of visit(w).

This theorem is proved by establishing the following invariant for the visit algorithm.

I1 Let S be the set of DTCAM buckets formed so far. T has an optimal split Z that includes S.

I1 holds at the start of optSplit as S=ϕ at this time. Assume that I1 holds just before the execution of visit(x), where x is a node of T Next shown is that I1 holds immediately following this execution of visit(x). Hence I1 holds when optSplit terminates and the constructed S is of minimum size. If count (x)<b when visit(x) is invoked, the visit simply returns and there is no change to S. Hence I1 holds following the execution of visit(x).

Next, consider the case when count(x)=b at the time visit (x) is invoked. This case breaks into two subcases-(a)x does not require a covering prefix and (b)x requires a covering prefix. When x does not require a covering prefix, the visit algorithm adds a bucket B(ST(x)) to S and removes ST(x) from the 1-bit trie. Let S' denote the new set of DTCAM buckets (S¹=S∪B(ST(x))) Note that B(ST(x)) is comprised of the b prefixes in the nodes of ST(x). If Z includes B(ST(x)) as well, then I1 holds following the execution of visit(x). If Z does not include B(ST(X)), then Z−S includes at least one bucket B' comprised only of a proper subset of the prefixes in ST(x) and possibly a covering prefix. This assertion follows from the definition of the subtree split method, which requires the successive removal of subtrees from the 1-bit trie until the 1-bit trie becomes empty; each subtree removed is represented as a DTCAM bucket. Let Z' be obtained from Z by first removing from the buckets of Z the prefixes in ST(x); then deleting empty buckets as well those that contain only a covering prefix; and finally adding B(ST(x)). Clearly Z' also is an optimal split (note that B' is deleted from Z when constructing Z') and S' is a subset of Z'. So, I1 holds following the execution of visit(x).

When x requires a covering prefix, node x does not contain a prefix and must have two children y and z. The first of these assertions follows from the definition of "requires a covering prefix" and the second follows from the observation that otherwise, count(x) equals the count of its lone child, which must be less than b (as established at the beginning of this proof). Without loss of generality, assume that count(y) ≧count(z). So, ≦count(y)<b. Let S'=S∪B(ST(y)), where B(ST(y)) is comprised solely of the prefixes in ST(y) and a covering prefix for y (if needed). There are three parts to the proof. (i) If B(ST(y))∈Z, then I1 holds following the execution of visit(x). (ii) If Z includes a bucket B' comprised solely of some of the prefixes in ST(y) and possibly a covering prefix, then let Z' be obtained from Z by first removing from the buckets of Z the prefixes in ST(y); then deleting empty buckets as well those that contain only a covering prefix; and finally adding B(ST(y)). Clearly Z' also is an optimal split and S' is a subset of Z'. So, I1 holds following the execution of visit(x). (iii) When (i) and (ii) don't apply, Z must contain a bucket B' comprised solely of prefixes in ST(z) and possibly a covering prefix as well as a bucket B" that includes the prefixes in ST(y) plus one or more prefixes from ancestors of x. Note that from the definition of the subtree split method, it follows that all prefixes in ST(z) are in buckets of Z that contain only prefixes of ST(z) and possibly a covering prefix (at most one covering prefix per bucket). Let Z' be obtained from Z by first removing from Z those buckets that contain prefixes of ST(z); then deleting from B'' the prefixes of ST(y) and adding in those of ST(z); and finally adding B(ST(y). Clearly Z' also is an optimal split and S' is a subset of Z'. So, I1 holds following the execution of visit(x). The final case to consider is count(x)>b. The proof for this case is similar to that for the case count(x)=b.

From Theorems 1 and 2, it follows that algorithm optSplit results in 1-1 2-level TCAMs with the fewest number of ITCAM prefixes and up to half as many ITCAM prefixes as in the ITCAMs resulting from the algorithm of the reference Zane. By deferring the computation of a node's count until it is needed, the complexity of optSplit becomes O(nW), where n is the number of prefixes in the forwarding table and W is the length of the longest prefix.

The buckets created by optSplit enjoy similar properties as enjoyed by those created by the subtree split algorithm of the reference Zane. The next two theorems are similar to theorems in the reference Zane.

THEOREM 3: The number of forwarding-table prefixes (this count excludes the covering prefix (if any)) in each bucket is in the range $$\left[\left\lceil \frac{b}{2} \right\rceil \cdot b\right]_{[b/2,b]},$$

except for the last bucket, which contains between 1 and b forwarding-table prefixes. When covering prefixes are accounted for, no bucket contains more than b prefixes.

PROOF: Follows directly from the visit algorithm of FIG. 7. Note that the buckets created by the algorithm of the reference Zane may have up to b+1 prefixes (including the covering prefix).

THEOREM 4: For a forwarding table with n prefixes, the number of DTCAM buckets generated is in the range $$\left[\left\lceil \frac{n}{b} \right\rceil, \left\lceil \frac{2n}{b} \right\rceil\right] [n/b, 2n/b].$$

PROOF: Follows from Theorem 3.

THEOREM 5: For a forwarding table with n prefixes, the power needed is that for an ITCAM search of at most $$\left\lceil \frac{2n}{b} \right\rceil [2n/b]$$

prefixes and a DTCAM search of at most b prefixes.

PROOF: To search a 1-1 2-level TCAM, a search of an ITCAM, a DTCAM is made, and also make 2 SRAM accesses. An assumption is made that the SRAM power is negligible. The ITCAM has as many prefixes as the number of DTCAM buckets, which by Theorem 4 is at most $$\left\lceil \frac{2n}{b} \right\rceil [2n/b].$$

Also, no DTCAM bucket has more than b prefixes.

Postorder Split

As defined in the reference Zane, a postorder split is required to pack exactly b forwarding-table prefixes into a DTCAM bucket (an unspecified number of covering prefixes may also be packed); an exception is made for 1 DTCAM bucket, which may contain up to b forwarding-table prefixes. By packing a subtree into a DTCAM bucket, means that the forwarding-table prefixes in the subtree are placed into the DTCAM bucket. This requirement on the number of forwarding-table prefixes per DTCAM bucket is met by packing several subtries carved from the original 1-bit trie into a single DTCAM bucket. The result is a many-1 2-level DTCAM. The algorithm of the reference Zane may pack up to W covering prefixes into a DTCAM bucket while that of the reference Halu packs up to $\lceil \log_2 b \rceil$ covering prefixes into a DTCAM bucket. In both algorithms, each bucket contributes a number of ITCAM entries equal to the number of carved subtrees packed into it. In this section, a new algorithm for postorder split is described. While the variation in the number of prefixes in a bucket is the same as for the algorithm of the reference Halu (from b to b+$\log_2$ b) and the worst-case number of ITCAM prefixes is the same for both the algorithm of the present invention and that of the reference Halu, the algorithm of the present invention generates much fewer ITCAM prefixes on real-world data sets. The present invention also includes a variant of the novel algorithm that has the property that each DTCAM bucket other than the last one has exactly b prefixes (including covering prefixes). The last bucket may be packed with null prefixes to make it the same size as the others. In this example each bucket is limited to b forwarding-table prefixes, the total number of buckets is increased slightly. PS1 is used to refer to the postorder split algorithm that strictly adheres to the definition of the reference Zane and PS2 is used to refer to the stated variant.

The strategy in PS1 is to first seed [n/b] DTCAM buckets with a feasible of the 1-bit trie T. A feasible subtree of T is any subtree of T that is the result of any possible carving sequence performed on T. The size of a feasible subtree is the number of forwarding-table prefixes contained in the nodes of the subtree (this count does not include any covering prefix that may be needed by the subtree). The buckets are seeded sequentially with feasible subtrees of as large a size as possible but not exceeding b. When a feasible subtree is used to seed a bucket, the feasible subtree is carved out of T and not available for further carving. In general, when a feasible subtree is carved from T, there maybe many subtrees left over. The feasible subtree selection process used in the present invention, however, is limited so that a single subtree remains following carving. So, the rest of the discussion in this example assumes that there is only one subtree after carving. It is important to note that other numbers of subtrees are possible within the true scope and spirit of the present invention. Following the seeding step, the present invention goes through as many rounds of feasible tree carving and packing as needed to completely carve out T. In each round, the bucket B with the fewest forwarding-table prefixes is selected. Let the number of forwarding-table prefixes in B be s. Next a feasible subtree of as large a size as possible is carved from the remaining T but not exceeding b−s and pack this feasible subtree into B. FIG. 8 gives the PS1 algorithm of the present invention. Here, feasibleST(T,q) determines a feasible subtree of T whose size is as large as possible but no more than q. The found subtree is bestST.

In the interests of run-time efficiency, a heuristic is used for feasibleST(T,q). This heuristic performs a traversal of T using the visit algorithm given in FIG. 9. In this visit algorithm, count(x) is the number of forwarding-table prefixes in ST(x) and only two feasible subtrees ST(x) and T−ST(x) are examined. Following the preorder traversal, bestST gives the best feasible subtree found. This subtree is packed into a bucket by algorithm PS1 and T updated to the subtree that remains after bestST is carved from T (the subtree that remains is either ST(x) or T−ST(x) for some x in T). Notice also that when bestST is carved out of T, it is necessary to update the counts of the nodes on the path from the root of T (prior to the carving) to the root of bestST.

LEMMA 1: Except for the last invocation of feasibleST(T, q), $$bestCount\lceil \frac{q}{2} \rceil [q/2].$$

PROOF: For all but the last invocation of feasibleST(T,q), count(root(T))>q. It will be shown that T contains a node y for which $$\lceil \frac{q}{2} \rceil [q/2] \leq count(y) \leq q.$$

Since the preorder traversal of feasibleST visits all nodes of T, $$bestCou\lceil \frac{q}{2} \rceil nt \geq [q/2].$$

Let y be a child of root(T) for which $$count(y) \geq \lceil \frac{q}{2} \rceil [q/2]$$

(note that such a y must exist). If count(y)≤q, then $$\lceil \frac{q}{2} \rceil [q/2] \leq count(y) \leq q.$$

If count(y)>q, then y has a child z with $$coun\lceil \frac{q}{2} \rceil t(z) \geq [q/2].$$

Let y be this z and repeat the preceding argument. Since the tree height is finite, a finite number of repetitions of this argument establishes the existence of a y for which $$\lceil \frac{q}{Z} \rceil [q/2] \leq count(y) \leq q.$$

LEMMA 2: Algorithm PS1 packs at most $\lceil \log_2 b \rceil$ subtrees into a bucket.

Follows from Lemma 1.

THEOREM 6: The number of ITCAM prefixes generated by algorithm PS1 is at most $$\lceil \frac{n}{b} \rceil \lceil \log_2 b \rceil [n/b][\log_2 b].$$

PROOF: Follows from Lemma 2, and the following facts
(a) the number of DTCAM buckets is $$\lceil \frac{n}{b} \rceil [n/b]$$

and (b) each subtree results in 1 ITCAM prefix.

The time complexity for feasibleST(T,q) is O(nW), where n is the number of forwarding-table prefixes and W is the length of the longest prefix. The time complexity of PS1 is dominated by the time spent in the $$O\left(\frac{(n)}{b \log b}\right)$$

invocations of feasibleST. Thus, the complexity of PS1 is $$O\left(\frac{(n^2 w \log b)}{b}\right)$$

Figures 11, 12, 13:
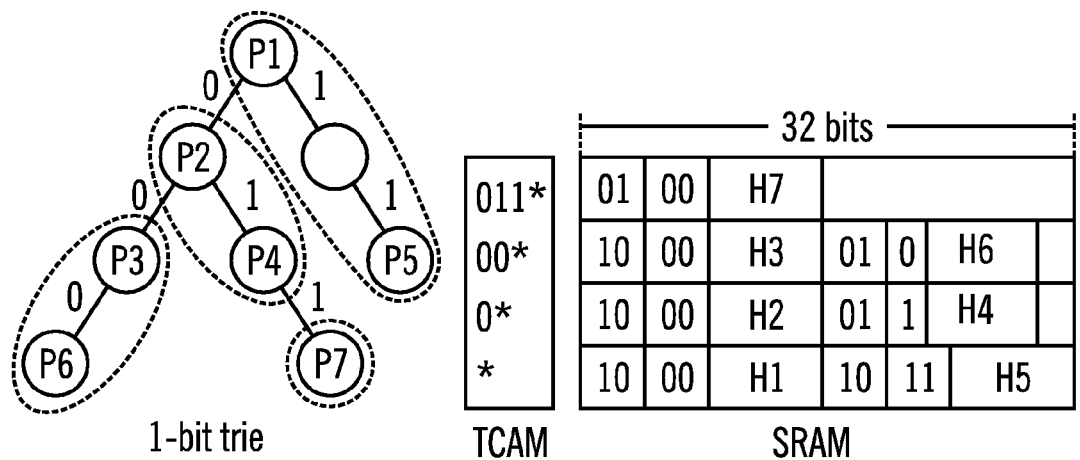
FIG. 11 is a high level flow of the visit function of feasibleST2 as used by PS2, according to the present invention.
FIG. 12 is a diagram illustrating the suffix node format of the Sanhi8 reference, according to the present invention.
FIG. 13 is a diagram of simple TCAM with SRAM (STW) for the prefix set of FIG. 1, according to the present invention.

FIG. 10 gives the variant PS2; the visit algorithm used for this variant is given in FIG. 11.

Simple TCAM with Wide SRAM

In the simple TCAM organization of FIG. 2, each word of the SRAM is used to store only a next hop. Since a next hop requires only a small number of bits (e.g., 10 bits are sufficient when the number of different next hops is up to 1024) and a word of SRAM is typically quite large (e.g., using a QDRII SRAM, 72 bits (dual burst) or 144 bits (quad burst) can be accessed at a time), the simple TCAM organization of FIG. 2 does not optimize SRAM usage. By using each word of the SRAM to store a subtree of the 1-bit trie of a forwarding table, the size of the required TCAM is reduced and hence reduce the power required for table lookup. The lookup time is not significantly affected as a lookup still requires 1 TCAM search (the TCAM to be searched is smaller and so the search requires less power but otherwise takes the same amount of time) and 1 SRAM access and search (the SRAM access takes the same amount of time regardless of whether a single hop or a subtree of the 1-bit trie is accessed; although the time to process the accessed SRAM word increases, the total SRAM time is dominated by the access time). To store a 1-bit subtree in an SRAM word, in this example the suffix-node structure is used in the reference W. Lu and S. Sahni, *Succinct representation of static packet classifiers*, International Conference on Computer Networking, 2007 (which is hereby incorporated by reference in its entirety and hereinafter referred to as "WLU".) to compactly store small subtrees of a 1-bit trie. FIG. 12 shows this structure.

Consider a subtree of a 1-bit trie T. Let N be the root of the subtree and let Q(N) be the prefix defined by the path from the root of T to N. Let P1 . . . Pk be the prefixes in the subtree plus the covering prefix for N (if needed). The suffix node for N will store a suffix count of k and for each prefix Pi, it will store the suffix Si obtained by removing the first |Q(N)| bits from Pi, the length |Si|=|Pi|−|Q(N)| of this suffix (the covering prefix (if any) is an exception, its suffix is * and the suffix length is 0) and the next hop associated with the suffix (this is the same as the next hop associated with the prefix Pi).

Let u be the number of bits allocated to the suffix count field of a suffix node and let v be the sum of the number of bits allocated to a length field and a next-hop field. Let len(Si) be the length of the suffix Si. The space needed by the suffix node fields for S1 . . . Sk is u+kv+Σlen(St) bits. Typically, the size of a suffix node is fixed to equal the bandwidth (or word size) of the SRAM in use and require that u+kv+Σlen(St) be less than or equal to this quantity. In some architectures, for example, it is possible to simultaneously access 1 SRAM word from each of q SRAMs. In this case, a suffix node size is used that q times that of a single SRAM word.

In a simple TCAM with wide SRAM (referred to as STW), subtrees of the 1-bit trie are carved out for a forwarding table; each subtree is mapped into a suffix node as described above (this of course limits the size of the subtree that may be carved); and the Q(N)s are placed into a TCAM and the suffix nodes are placed into an SRAM in decreasing order of Q(N) length.

As an example, consider the 7-prefix forwarding table of FIG. 1. Suppose that a suffix node is 32 bits long (equivalently, the bandwidth of the SRAM is 32 bits). In this example 2 bits are used for the suffix count field (this allows up to 4 suffixes in a node as the count must be more than 0), 2 bits for the suffix length field (permitting suffixes of length up to 3), and 12 bits for a next hop (permitting up to 4096 different next hops). With this bit allocation, a suffix node may store up to 2 suffixes. FIG. 13 (a) shows a carving of the 1-bit trie (FIG. 3) for the 7-prefix example. This carving has the property that no subtree needs a covering prefix and each subtree may be stored in a suffix node using the stated format. FIG. 13 (b) shows the STW representation for this carving.

To search for the longest matching prefix (actually the next hop associated with this prefix) for the destination address d, the first the TCAM index of the longest matching Q(N) in the TCAM is found. This index tells us which SRAM word to search. The SRAM word is then searched for the longest suffix Si that matches d with the first |Q(N)| bits stripped.

If the average number of prefixes packed into a suffix node is a1, then the TCAM size is approximately $n/a_1$ where n is the total number of forwarding-table prefixes. So, the power needed for a lookup in a forwarding table using an STW is about $1/a_1$ that required when the simple TCAM organization of FIG. 2 is used. Equivalently, if in the case where a TCAM whose capacity is n prefixes, the STW representation permits us to handle forwarding tables with up to n×a1 prefixes while tables with up to only n prefixes may be handled using the organization of FIG. 1; in both cases, the power and lookup time are about the same.

In the remainder of this section, proposed is a heuristic to carve subtrees from T as well as a dynamic programming algorithm that does this. The heuristic attempts to minimize the number of subtrees carved (each subtree must fit in an SRAM word or suffix node) while the dynamic programming algorithm guarantees a minimum carving.

Carving Heuristic

Let u and v be as above and let w be the size of a suffix node. For any node x in the 1-bit trie, let ST(x) be the subtree rooted at x. Note that ST(x) changes as subtrees from T are carved out. Let ST(x).numP be the number of prefixes in ST(x) (the covering prefix (if needed) is excluded) and let ST(x).numB be the number of bits needed to store the suffix lengths, suffixes and next hops for these prefixes of ST(x). Clearly, when x is null, ST(x).numP=ST(x).numB=0. When x is not null, let l and r be its two children (either or both may be null). The following recurrence for ST(x).numB is obtained.

$$ST(x) \cdot numB = \begin{cases} ST(l) \cdot numB + ST(l) \cdot numP + ST(r) \cdot numB + ST(r) \cdot numP + v & x \text{ contains a prefix} \\ ST(l) \cdot numB + ST(l) \cdot numP + ST(r) \cdot numB + ST(r) \cdot numP & \text{otherwise} \end{cases} \quad (1)$$

To see the correctness of this recurrence, notice that each prefix in ST(l) and ST(r) has a suffix that is 1 longer in ST(x) than in ST(l) and ST(r). So, ST(l).numB+ST(l).numP+ST (r).numB+ST(r).numP bits are needed in this example to store their lengths, suffixes, and next hops. Additionally, when x contains a prefix, v bits are needed to store the length (0) of its suffix as well as its next hop; no bits are needed for the suffix itself (as the suffix is * and has length 0).

The size, ST(x).size, of the suffix node needed by ST(x) is given by $$ST(x) \cdot size = \begin{cases} ST(x) \cdot numB + u & \text{no covering prefix is needed for } x \\ ST(x) \cdot numB + u + x & \text{otherwise} \end{cases} \quad (2)$$

The correctness of Equation 2 follows from the observation that in either case, u additional bits are needed for the suffix count. When a covering prefix is needed, in this example v bits for the length (which is 0) is required and next-hop fields for this covering prefix.

The carving heuristic performs a postorder traversal of the 1-bit trie T using the visit algorithm of FIG. 14. Whenever a subtree is split from the 1-bit trie, the prefixes in that subtree as well as a covering prefix (if needed) are put into a suffix node and a TCAM entry for this suffix node generated.

The complexity of the visit algorithm (including the time to recompute x.size) is O(1). So, the overall complexity of the tree carving heuristic is O(nW), where n is the number of prefixes in the forwarding table and W is the length of the longest prefix.

Dynamic Programming Carving Algorithm

Define a partial subtree,PT(N), to be a feasible subtree of T that is rooted at N. Let opt(N,b,p) be the minimum number of suffix nodes in any carving of ST(N) under the following constraints:
1. When all but one of the subtrees represented by the suffix nodes are carved out of ST(x), a partial subtree PT(N) is left. Note that since every suffix node contains at least 1 forwarding-table prefix, every carved subtree (other than PT(N) contains at least 1 forwarding-table prefix.
2. PT(N).numB−b and PT(N).numP−p.

Dynamic Programming Carving Algorithm

Note that opt(N,b,p) includes the suffix node needed for PT(N) when p>0; when p=0, no suffix node is needed for PT(n); and opt(N,0,0)=∞ when N contains a forwarding-table prefix as, in this case, it is not possible to have a PT(N) that contains no forwarding-table prefixes. In this example, opt (N,s,y)=∞ whenever s<0 or y<0.

Let opt(N) be the minimum number of suffix nodes in any carving of ST(N). Recurrence equations are developed from which opt(root(T)), the minimum number of suffix nodes in any carving of T, may be computed. In the following, pMax denotes the maximum number of suffixes that may be packed into a suffix node (notice that pMax<w/v and is also no more than the maximum permissible value for suffix count).

Consider an optimal carving of ST(N). If ST(N) needs no covering prefix, then PT(N) has between 0 and pMax prefixes. When a covering prefix is needed, PT(N), has between 1 and pMax−1 prefixes in the corresponding suffix node for the covering prefix as space is needed. So, $$opt(N) = \qquad (3)$$
$$\begin{cases} \min_{0 \le b \le w-u, 0 \le p \le pMax} \{opt(N, b, p)\} & \text{no covering prefix is needed for } N \\ \min_{v \le b \le w-u-v, 1 \le p \le pMax-1} \{opt(N, b, p)\} & \text{otherwise} \end{cases}$$

To obtain the recurrence for opt(N,b,p), there are three cases to consider—N has 0, 1, and 2 non-null children. When N has no non-null child, N is a leaf of T and so has a forwarding-table prefix. So, $$opt(N, b, p) = \begin{cases} 1 & b = v \wedge p = 1 \\ \infty & \text{otherwise} \end{cases} \qquad (4)$$

Next, consider the case when N has only one non-null child v. If no covering prefix is needed for N, then N contains a forwarding-table prefix, which must be in PT(N). When p=1, only this prefix can be in PT(N) and ST(y) is optimally carved into suffix nodes. When p>1, the prefix in N shares a suffix node with some prefixes of ST(y). So, $$opt(N, b, p) = \begin{cases} opt(y) + 1 & b = v \wedge p = 1 \\ opt(y, b - (p-1) - v, p - 1) & \text{otherwise} \end{cases} \qquad (5)$$

If a covering prefix is needed for N, then N does not contain a prefix. When p=0, PT(N) includes no prefix and an optimal carving is obtained by carving ST(y). When p>0, PT(N) includes at least one prefix from ST(N). So, $$opt(N, b, p) = \begin{cases} opt(y) & b = 0 \wedge p = 0 \\ opt(y, b - p, p) & \text{otherwise} \end{cases} \qquad (6)$$

In the last case, N has two non-null children y and z. When N has a prefix, this prefix has to be in a new suffix node when p=1. When p>1, this prefix is in a suffix node that contains p−1 prefixes from z or p−1 from y or some combination of p−1 prefixes from y and z. So, $$opt(N, b, p) = \begin{cases} opt(y) + opt(z) + 1 & b = v \wedge p = 1 \\ \min \begin{cases} opt(y) + opt(z, b - (p-1) - v, p-1), opt(z) + opt(y, b-(p-1)-v, p-1), \\ \min_{v \le e \le b, 0 < f < p-1} \{opt(y, e, f) + opt(z, b - e - (p-1) - v, p - f - 1)\} \end{cases} & \text{otherwise} \end{cases} \qquad (7)$$

Suppose that N has no prefix. Now, a covering prefix for N may or may not be needed. Regardless, when p=0, PT(N) contains no prefixes and results from an optimal carving of ST(y) and ST(z). When p=1, PT(N) includes p>0 prefixes and the suffix node for PT(N) includes either p prefixes from ST(y) or p from ST(z) or some combination of p prefixes from ST(y) and ST(z). So, $$opt(N, b, p) = \begin{cases} opt(y) + opt(z) & b = 0 \wedge p = 0 \\ \min\{opt(y, b-p, p) + opt(z), opt(y) + opt(z, b-p, p), \\ \min_{v \le e \le b, 0 < f < y} \{opt(y, e, f) + opt(z, b - e - p, p - e)\}\} \end{cases} & \text{otherwise} \end{cases} \qquad (8)$$

The time to compute opt(root(T)) is dominated by the time to compute opt(*,*,*). Using Equations 4 through 8 above, each opt(*,*,*) value can be computed in O(w*pMax) time. Since O(nWwpMax)opt(*,*,*) are to be computed, the time required to determine opt(root(T)) is $O(nWw^2pMax^2)$–O $(nWw^4/v^2)$ (as pMax<w/v).

2-Level TCAM with Wide SRAM

Using the STW strategy of the section entitled "Simple TCAM with Wide SRAM", the power needed to search a forwarding table is approximately $1/a_1$ that required when the simple TCAM strategy of FIG. 2 is used, where a1 is the average number of prefixes packed into a suffix node. Equivalently, with the same power budget or TCAM capacity, forwarding tables can be forwarded that are a1 times as large. Further gains in power reduction and increase in forwarding-table size that may be supported can be achieved by adopting a 2-level TCAM structure (ITCAM and DTCAM). Some of the possible 2-level TCAM structures that use wide SRAMs are discussed in the remainder of this section.

1-1 2-Level TCAM

Considered are 4 possible organizations for a 1-1 2-level TCAM with wide SRAM. The first of these (FIG. 15) uses a single wide SRAM. In this example begins with the 1-bit trie for the forwarding table and create suffix nodes as in the section entitled "Simple TCAM with Wide SRAM." Let U be the 1-bit trie for the Q(N)s stored in the TCAM for the corresponding STW organization. The subtree split algorithm of the present invention is applied in the section entitled "Subtree Split" to carve U into DTCAM buckets of size b (each bucket has up to b prefixes (including a covering prefix if needed) of U). The ITCAM is set up as in the section entitled "Subtree Split" above. However, for the DTCAM, DTCAM buckets are padded that have fewer than b prefixes with null prefixes. The DTCAM buckets are placed in the DTCAM in the same order as used for their corresponding ITCAM indexes; the suffix nodes are placed into wide SRAM so that the suffix node in the ith SRAM word corresponds to the prefix in the ith DTCAM position. The defined 1-1 2-level TCAM organization is referred to as the 1-12Wa organization. FIG. 15 shows the layout for the 7-prefix forwarding-table example of FIG. 1. This layout uses DTCAM buckets with b=3.

To search for the longest matching prefix of d using the 1-12Wa organization, in this example, a first search the ITCAM for the first ITCAM entry that matches d is performed. From the index of this ITCAM entry and the DTCAM bucket size b, the location of the DTCAM bucket that is to be searched is computed. The identified DTCAM bucket is next searched for the first entry that matches d. The SRAM word corresponding to this matching entry is then searched for the longest matching prefix using the search strategy for a suffix node. In all, 2 TCAM searches and 1 SRAM search are done. The power reduction, relative to the STW organization, is by a factor equal that provided by the subtree split scheme of the section entitled "Subtree Split" $n/(a_1 b)$. Additionally, the number of SRAM accesses is only 1 vs. 2 for the scheme of section entitled "Subtree." However, 1-12Wa may waste up to half of the DTCAM because the subtree split algorithm of the section entitled "Subtree" may populate DTCAM buckets with as few as $$\left\lceil \frac{b}{2} \right\rceil$$

prefixes.

The problem of inefficient DTCAM space utilization can be overcome by 1-12Wa by introducing an ISRAM (this may just be a logical partition of the SRAM used for suffix nodes) as is done in a 2-level TCAM organization that uses subtree split (FIG. 4). Now, following the search of the ITCAM, an ISRAM access is made to determine the start of the DTCAM bucket that is to be searched. This variant of 112Wa is referred to as 1-12Wb. FIG. 16 shows the 1-12Wb layout for in this 7-prefix example.

Figure 17:
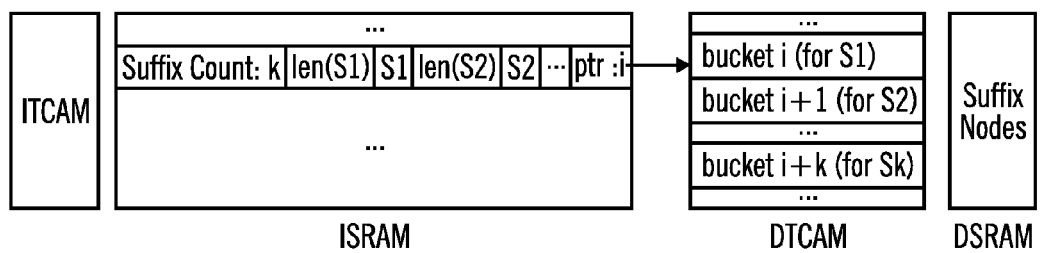
FIG. 17 is a layout for the 7-prefix forwarding table example of FIG. 1 illustrating 1-12Wc with variable-size DTCAM buckets, according to the present invention.
Figure 18:
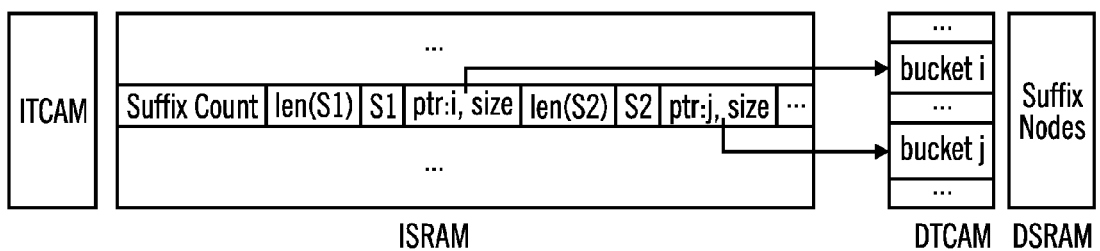
FIG. 18 is a layout for the 7-prefix forwarding table example of FIG. 1 illustrating 1-12Wd with variable-size DTCAM buckets, according to the present invention.

Two additional organizations, 1-12Wc and 1-12Wd result from recognizing that the ISRAM could be used to store a suffix node rather than just a pointer to a DTCAM bucket. 1-12Wc (FIG. 17) uses the fixed DTCAM bucket size organization used by 1-12Wa while 1-12Wd uses the variable DTCAM bucket organization of 1-12Wb. The suffix nodes in the ISRAM are constructed from the 1-bit trie V for the prefixes used in the ITCAM of FIGS. 15 and 16. This construction of suffix nodes uses one of the algorithms given in the section entitled "Simple TCAM with Wide SRAM." The prefixes in the ITCAM for the 1-12Wc and 1-12Wd organizations correspond to those for its ISRAM suffix nodes.

To search using 1-12Wc, for example, a first search the ITCAM for the first entry that matches d is performed, then the corresponding suffix node in the ISRAM is accessed and searched using the search method for a suffix node. This search yields the same result as obtained by searching the ITCAM of the 1-12Wa representation. Since DTCAM buckets are of a fixed size, using the single pointer stored in the searched ISRAM suffix node, a determination is made which DTCAM bucket to search next.

Many-to-One 2-Level TCAM

Figure 19:
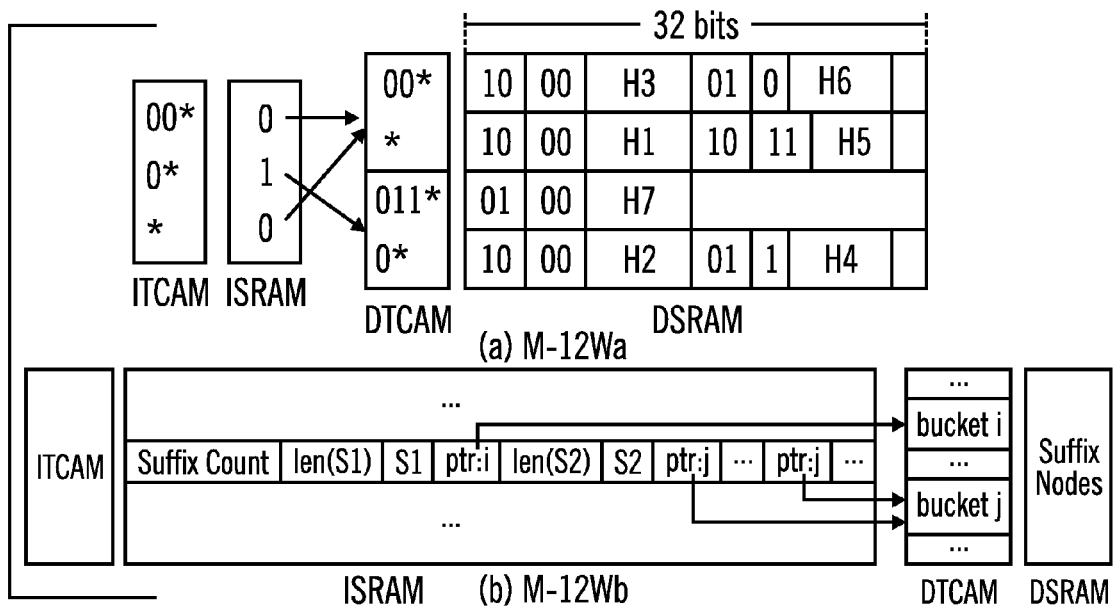
FIG. 19 is a layout illustrating M-12Wa and M-12Ws of many-to-one 2-level TCAM with wide SRAM, according to the present invention.

The many-1 2-level TCAM with wide memory (M-12W) uses fixed-size DTCAM buckets that are filled to capacity with prefixes from U using the postorder split algorithm of the section entitled "Postorder Split." Two variants (M-12Wa and M-12Wb, see FIG. 19) are possible depending on whether the ISRAM simply stores pointers to DTCAM buckets (as in FIG. 5) or it stores suffix nodes formed from V.

The search process for an M-12Wa (b) is the same as that for a 1-12Wb (d).

A Comparison

Suppose in this example there is a forwarding table that has n prefixes. FIG. 20 shows the amount of TCAM memory and TCAM power required by each of forwarding-table representations considered in the present invention. The term Simple in FIG. 20 denotes the TCAM organization of FIG. 2, 1-1 denotes a 1-1 TCAM using subtree split, M-1 denotes a many-1 TCAM using one of the postorder split methods of the reference Halu and the section entitled "Postorder Split", and a2: is the average number of prefixes stored in the suffix nodes of an ISRAM.

Experimental Results $C_{++}$ codes for the algorithms in the present invention were compiled using the GCC 3.3.5 compiler with optimization level O3 and run on a 2.80 GHz Pentium 4 PC. The performance of the algorithms in the present invention is compared with that of recently published algorithms the reference Zane, and the reference Halu to construct low-power 2-level TCAMs for very large forwarding tables. In the wide SRAM strategies, in this example a QDRII SRAM (quad burst) is assumed that supports the retrieval of 144 bits of data with a single memory access. For all implementations, 12 bits were allocated for each next hop field. For the ISRAM in 1-12Wb and 1-12Wd, the size of the pointer pointing to a DTCAM entry was 16 bits and another 10 bits were used to specify the actual size of a bucket. For the ISRAM in 1-12Wc, M-12Wa and M-12Wb, the size of the pointer pointing to a DTCAM bucket was 10 bits. These experiments used both IPv4 and IPv6 data sets.

IPv4 Router Tables

For the IPv4 tests, three IPv4 router tables AS1221, AS3333, and AS4637 were used that were downloaded from online URL (http://bgp.potaroo.net which was visited on June 2007). The number of prefixes in these router tables is 281516, 211968 and 210119, respectively.

2-Level TCAMs without Wide SRAMs

First, the 1-1 2-level TCAM algorithm optSplit is compared with the corresponding algorithm subtree-split of the reference Zane. Recall that for any given DTCAM bucket size, optSplit results in an ITCAM of minimum size, where size of a TCAM is the number of TCAM entries. Note also that, for 1-1 2-level TCAMs, the ITCAM size equals the number of DTCAM buckets. Table 1 gives the ITCAM size constructed by these two algorithms for different DTCAM bucket size b. FIG. 21 plots the data for AS1221. Even though subtree-split may generate ITCAMs whose size is up to twice optimal, on these 3 IPv4 test sets, the ITCAMs generated by subtree-split were only between 1.9% and 3.4% larger than optimal; the average and standard deviation were 2.9% and 0.1%, respectively.

TABLE 1

ITCAM size for 1-1 2-level TCAMs

| Data Set | Algorithm | b = 64 | b = 128 | b = 256 | b = 512 | b = 1024 |
|---|---|---|---|---|---|---|
| AS1221 | subtree - split | 5938 | 2946 | 1467 | 734 | 377 |
| | optSplit | 9757 | 2861 | 1429 | 720 | 367 |
| AS3333 | subtree - split | 4441 | 2193 | 1091 | 543 | 276 |
| | optSplit | 4294 | 2121 | 1055 | 531 | 269 |
| AS4637 | subtree - split | 4405 | 2172 | 1079 | 941 | 274 |
| | optSplit | 4257 | 2108 | 1048 | 929 | 266 |

Figure 22:
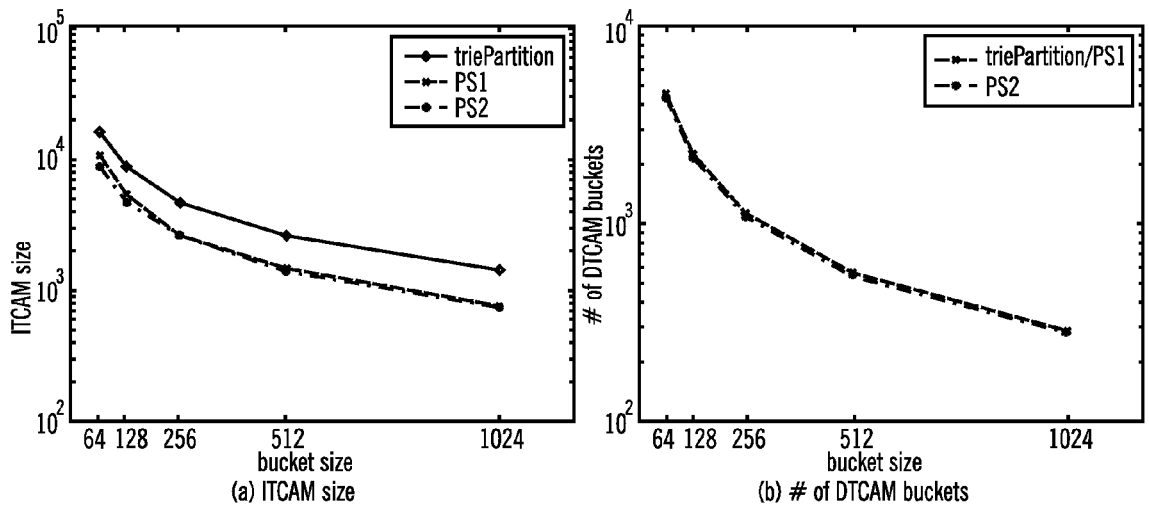
FIG. 22 is a plot illustrating a ITCAM size and number of DTCAM buckets for many-1 2-level TCAM for AS1221, according to the present invention.
Figure 23:
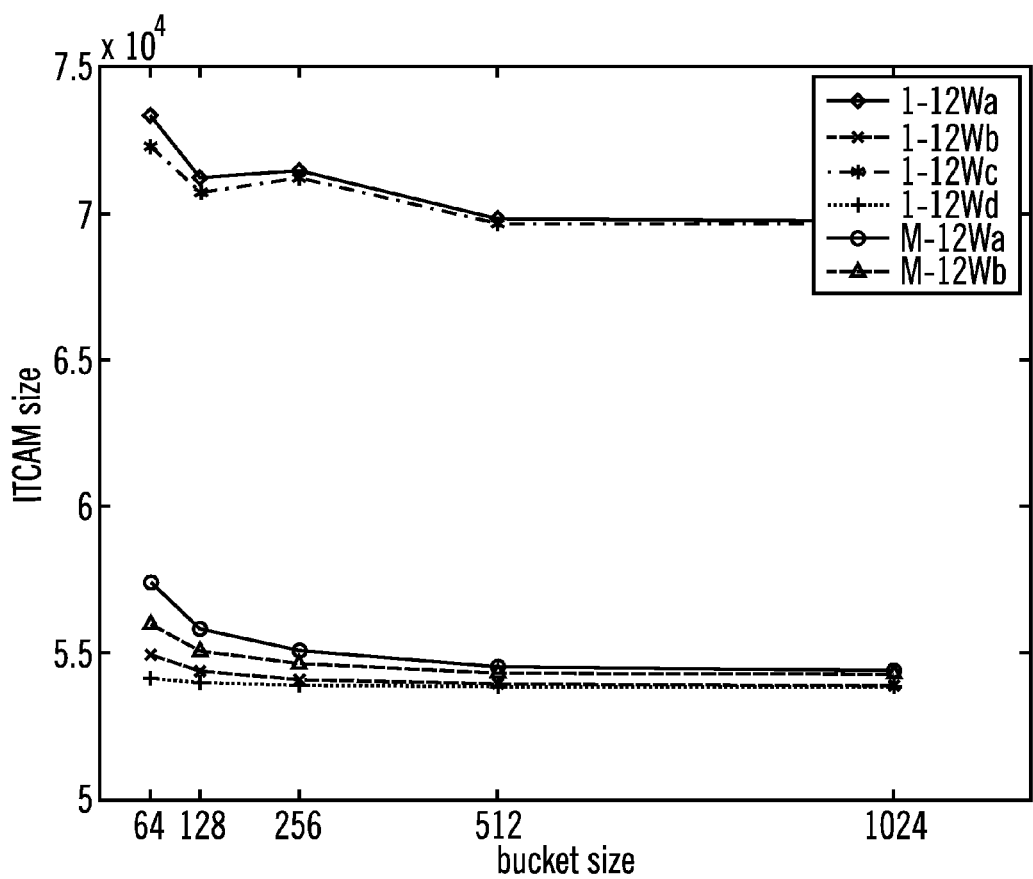
FIG. 23 is a plot illustrating total TCAM size with wide SRAM for AS1221, according to the present invention.

For many-1 2-level TCAMs, the algorithms PS1 and PS2 of the present invention are compared with postorder-split of the reference Zane and triePartition of the reference Halu. The reference Halu has established the superiority of triePartition to postorder-split of the reference Zane. Though the reference Halu has established the superiority of triePartition to postorder-split in the worst case analysis, it didn't compare them in terms of real-life router tables. Tables 2 and 3 show the ITCAM size and the number of DTCAM buckets constructed by these four algorithms. FIG. 22 plots the data for AS1221. It can be seen that PS2 has the best performance. The ITCAMs constructed by triePartition are from 80% to 137% larger than those constructed by PS2 with the average and standard deviation being 98% and 48%, respectively. The size of the ITCAMs constructed by PS1 were between 0.94 and 1.22 times that of the ITCAMs constructed by PS2; the average and standard deviation were 1.08 and 0.16, respectively. Between triePartition and postorder-split, postorder-split required 29% to 38% larger ITCAMs with 34% in average and 3% as the standard deviation. The number of DTCAM buckets constructed by triePartition was between 4% to 7% more than that constructed by PS2; the average and standard deviation being 3% and 1%, respectively. PS1 and triePartition resulted in the same number of DTCAM buckets as did postorder-split.

TABLE 2

ITCAM size for many-1 2-level TCAMs

| Data Set | Algorithm | b = 64 | b = 128 | b = 256 | b = 512 | b = 1024 |
| --- | --- | --- | --- | --- | --- | --- |
| AS1221 | triePartition | 16040 | 8773 | 4694 | 2574 | 1436 |
|  | PS1 | 10798 | 5345 | 2602 | 1473 | 759 |
|  | PS2 | 8804 | 4638 | 2601 | 1398 | 731 |
| AS3333 | triePartition | 11981 | 6440 | 3488 | 1921 | 1047 |
|  | PS1 | 7812 | 3698 | 1664 | 905 | 348 |
|  | PS2 | 6569 | 3293 | 1667 | 956 | 451 |
| AS4637 | triePartition | 11856 | 6364 | 3468 | 1899 | 1068 |
|  | PS1 | 7670 | 3585 | 1687 | 906 | 445 |
|  | PS2 | 6309 | 3276 | 1639 | 967 | 451 |

TABLE 3

Number of DTCAM buckets for many-1 2-level TCAMs

| Data Set | Algorithm | b = 64 | b = 128 | b = 256 | b = 512 | b = 1024 |
| --- | --- | --- | --- | --- | --- | --- |
| AS1221 | triePartition | 4894 | 2327 | 1136 | 569 | 278 |
|  | PS1 | 4854 | 2327 | 1136 | 569 | 278 |
|  | PS2 | 4990 | 2239 | 1111 | 553 | 276 |
| AS3333 | triePartition | 3653 | 1751 | 855 | 422 | 269 |
|  | PS1 | 3653 | 1751 | 855 | 422 | 299 |
|  | PS2 | 3419 | 1682 | 839 | 416 | 208 |
| AS4637 | triePartition | 3623 | 1737 | 848 | 418 | 208 |
|  | PS1 | 3623 | 1737 | 848 | 418 | 208 |
|  | PS2 | 3390 | 1688 | 828 | 413 | 266 |

2-Level with Wide SRAMs

Figure 25:
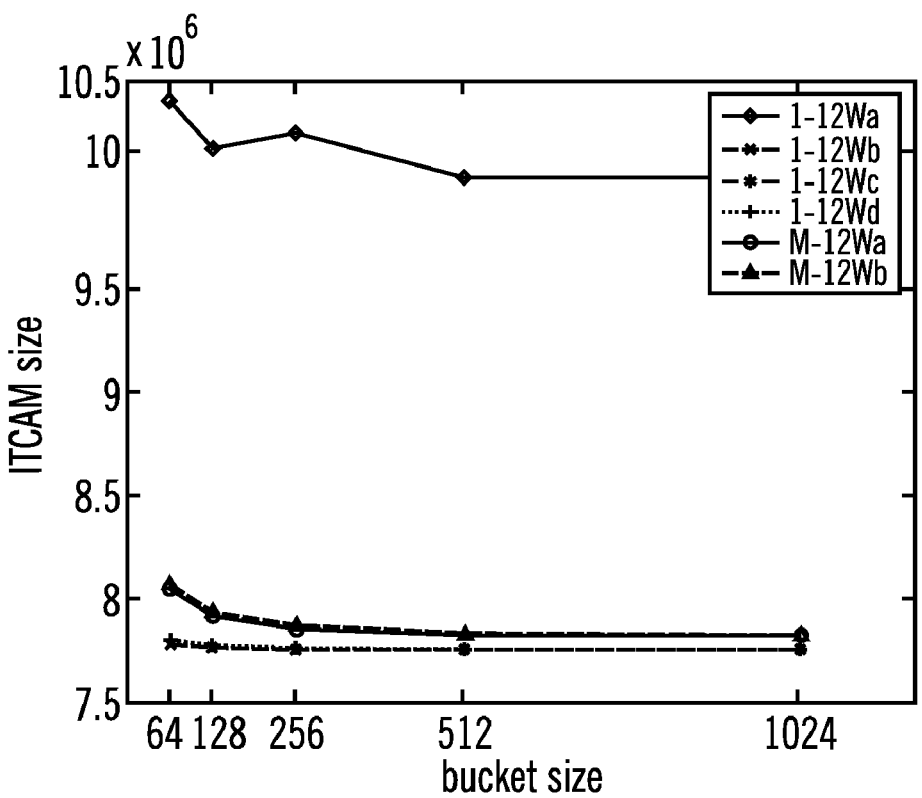
FIG. 25 is a plot illustrating total SRAM size with wide SRAM for AS1221, according to the present invention.

For the benchmarking of 2-level TCAMs with wide SRAMs, the optSplit for 1-1 2-level TCAMs and PS2 for many-1 2-level TCAMs was used. These experiments indicated that the carving heuristic and the dynamic programming carving algorithm of the section above entitled "Simple TCAM with Wide SRAM" give similar results. Since the heuristic is considerably faster, the carving heuristic for benchmarking is used here. Table 4 shows the total TCAM size (ITCAM plus DTCAM) constructed by each of the 6 wide-SRAM algorithms (1-12Wa, 1-12Wb, 1-12Wc, 1-12Wd, M-12Wa, and M-12Wb). FIG. 25 plots the data for AS1221. Table 5 shows the same data normalized by that for M-12Wb. The normalization was done by dividing the datum for each algorithm, each data set, and each bucket size by the corresponding datum for M-12Wb. This resulted in 15 data for each algorithm (3 data sets and 5 bucket sizes per algorithm). The min, max, mean, and standard deviation in these 15 data are reported in the table for each of the 3 algorithms. The six strategies cluster into two groups 1-12Wa and 1-12Wc being the first group and the remaining 4 defining the second group. The TCAM size is about the same for each strategy in the same group. Strategies in the first group required between 26% to 35% more TCAM memory than required by strategies in the second group.

TABLE 4

Total TCAM size with wide SRAMs

| Data Set | Algorithm | b = 64 | b = 128 | b = 256 | b = 512 | b = 1024 |
| --- | --- | --- | --- | --- | --- | --- |
| AS1221 | 1-12Wa | 73320 | 71208 | 71446 | 69768 | 69700 |
|  | 1-12Wb | 54953 | 54377 | 54103 | 53961 | 53893 |
|  | 1-12Wc | 72287 | 79704 | 71193 | 69644 | 69639 |
|  | 1-12Wd | 54146 | 53988 | 53995 | 53862 | 53845 |
|  | M-12Wa | 57400 | 55818 | 55055 | 54506 | 54388 |
|  | M-12Wb | 55981 | 55071 | 54620 | 54314 | 34294 |
| AS3333 | 1-12Wa | 54145 | 52761 | 53199 | 53885 | 35350 |
|  | 1-12Wb | 41402 | 48978 | 40776 | 40674 | 40623 |
|  | 1-12Wc | 53381 | 52388 | 53010 | 53769 | 55301 |
|  | 1-12Wd | 40819 | 49688 | 49628 | 40599 | 40594 |
|  | M-12Wa | 43178 | 41997 | 41324 | 41138 | 41054 |
|  | M-12Wb | 42139 | 41460 | 41026 | 40991 | 40976 |
| AS4637 | 1-12Wa | 53755 | 52632 | 52685 | 53352 | 55350 |
|  | 1-12Wb | 41950 | 48631 | 40428 | 40327 | 40277 |
|  | 1-12Wc | 52998 | 52260 | 32498 | 53257 | 55301 |
|  | 1-12Wd | 40461 | 48345 | 40282 | 40253 | 40238 |
|  | M-12Wa | 42792 | 41605 | 41074 | 40648 | 41046 |
|  | M-12Wb | 41759 | 41076 | 40773 | 40485 | 40976 |

TABLE 5

Total TCAM size normalized by that of M-12Wb

| Algorithm | min | max | mean | standard deviation |
| --- | --- | --- | --- | --- |
| 1-12Wa | 1.27 | 1.35 | 1.30 | 0.01 |
| 1-12Wb | 0.98 | 1.00 | 0.99 | 0.00 |
| 1-12Wc | 1.26 | 1.35 | 1.29 | 0.01 |
| 1-12Wd | 0.97 | 0.99 | 0.98 | 0.00 |
| M-12Wa | 1.00 | 1.03 | 1.01 | 0.00 |

Figure 24:
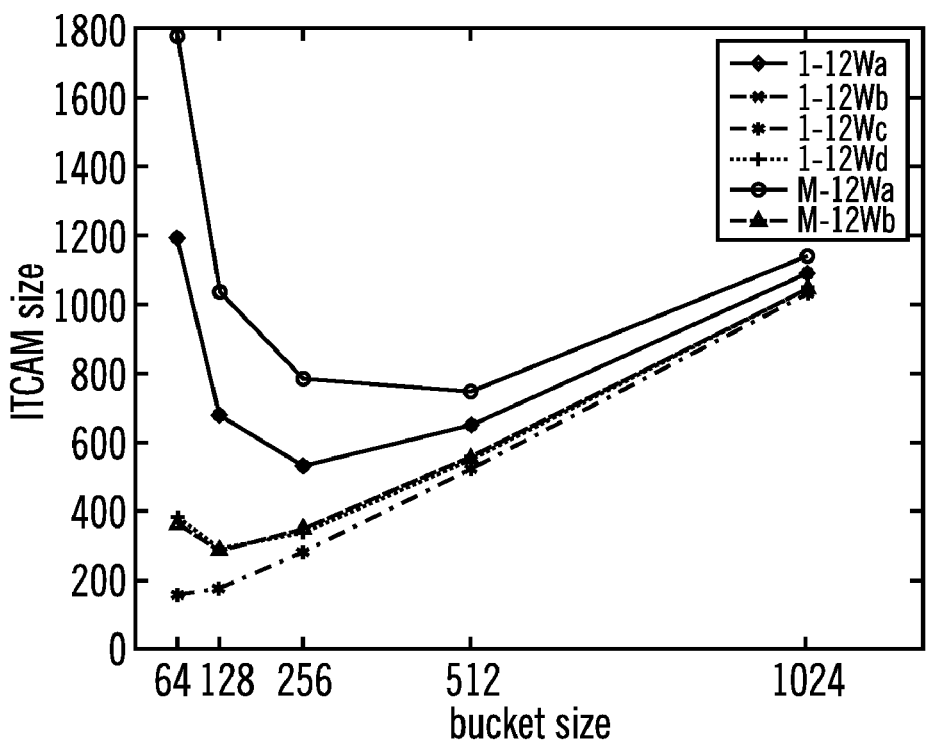
FIG. 24 is a plot illustrating total TCAM power with wide SRAMs for AS1221, according to the present invention.

Table 6 shows the total TCAM power required by the 6 strategies and FIG. 24 plots the data for AS1221. Table 7 shows this data normalized by that for M-12Wb. On the power metric, 1-12Wc is the clear winner.

TABLE 6

Total TCAM power with wide SRAMs

| Data Set | Algorithm | b = 64 | b = 128 | b = 256 | b = 512 | b = 1024 |
| --- | --- | --- | --- | --- | --- | --- |
| AS1221 | 1-12Wa | 1192 | 689 | 534 | 648 | 1092 |
|  | 1-12Wb | 1192 | 689 | 534 | 648 | 1092 |
|  | 1-12Wc | 159 | 176 | 281 | 524 | 1031 |
|  | 1-12Wd | 385 | 291 | 336 | 549 | 1044 |
|  | M-12Wa | 1784 | 1034 | 783 | 746 | 1140 |
|  | M-12Wb | 365 | 287 | 348 | 554 | 1046 |
| AS3333 | 1-12Wa | 897 | 537 | 463 | 617 | 1078 |
|  | 1-12Wb | 897 | 537 | 463 | 617 | 1078 |
|  | 1-12Wc | 133 | 164 | 274 | 521 | 1029 |
|  | 1-12Wd | 305 | 247 | 315 | 542 | 1039 |
|  | M-12Wa | 1322 | 781 | 620 | 690 | 1118 |
|  | M-12Wb | 283 | 244 | 322 | 543 | 1040 |
| AS4637 | 1-12Wa | 891 | 536 | 461 | 616 | 1078 |
|  | 1-12Wb | 891 | 536 | 461 | 616 | 1078 |
|  | 1-12Wc | 134 | 164 | 274 | 521 | 1029 |
|  | 1-12Wd | 302 | 258 | 315 | 542 | 1039 |

TABLE 6-continued

Total TCAM power with wide SRAMs

| Data Set | Algorithm | b = 64 | b = 128 | b = 256 | b = 512 | b = 1024 |
|---|---|---|---|---|---|---|
| | M-12Wa | 1320 | 773 | 626 | 712 | 1110 |
| | M-12Wb | 278 | 244 | 325 | 549 | 1040 |

TABLE 7

Total TCAM power normalized by that of M-12Wb

| Algorithm | min | max | mean | standard deviation |
|---|---|---|---|---|
| 1-12Wa | 1.04 | 3.27 | 1.82 | 0.23 |
| 1-12Wb | 1.04 | 3.27 | 1.82 | 0.23 |
| 1-12Wc | 0.44 | 0.99 | 0.78 | 0.05 |
| 1-12Wd | 0.97 | 1.09 | 1.01 | 0.01 |
| M-12Wa | 1.07 | 4.89 | 2.50 | 0.38 |

Table 8 shows the total SRAM size required by the 6 strategies and FIG. 25 plots the data for AS1221. Table 9 shows this data normalized data for the M-12Wb. The strategies cluster into two groups with strategies in the same group requiring about the same amount of SRAM. The first group comprises 1-12Wb, 1-12Wd, M-12Wa, and M-12Wb while the second group comprises 1-12Wa and 1-12Wc. The SRAM requirement of strategies in the first group are between 26% to 35% larger than that for those in the second group; the average being 29%.

TABLE 8

Total SRAM size (KBytes)

| Data Set | Algorithm | b = 64 | b = 128 | b = 256 | b = 512 | b = 1024 |
|---|---|---|---|---|---|---|
| AS1221 | 1-12Wa | 1269 | 1242 | 1251 | 1224 | 1224 |
| | 1-12Wb | 949 | 947 | 947 | 946 | 946 |
| | 1-12Wc | 1270 | 1242 | 1251 | 1224 | 1224 |
| | 1-12Wd | 951 | 949 | 947 | 946 | 946 |
| | M-12Wa | 981 | 966 | 959 | 954 | 954 |
| | M-12Wb | 984 | 968 | 960 | 954 | 954 |
| AS3333 | 1-12Wa | 937 | 920 | 931 | 945 | 972 |
| | 1-12Wb | 715 | 714 | 713 | 713 | 713 |
| | 1-12Wc | 938 | 920 | 931 | 945 | 972 |
| | 1-12Wd | 717 | 715 | 714 | 713 | 713 |
| | M-12Wa | 738 | 727 | 720 | 720 | 720 |
| | M-12Wb | 740 | 728 | 721 | 720 | 720 |
| AS4637 | 1-12Wa | 930 | 918 | 922 | 936 | 972 |
| | 1-12Wb | 709 | 708 | 707 | 707 | 707 |
| | 1-12Wc | 931 | 918 | 922 | 936 | 972 |
| | 1-12Wd | 711 | 709 | 708 | 707 | 707 |
| | M-12Wa | 731 | 729 | 716 | 711 | 720 |
| | M-12Wb | 733 | 722 | 716 | 711 | 720 |

TABLE 9

Total SRAM size normalized by that of M-12Wb

| Algorithm | min | max | mean | standard deviation |
|---|---|---|---|---|
| 1-12Wa | 1.26 | 1.35 | 1.29 | 0.01 |
| 1-12Wb | 0.97 | 0.99 | 0.98 | 0.00 |
| 1-12Wc | 1.26 | 1.35 | 1.29 | 0.01 |
| 1-12Wd | 0.97 | 0.99 | 0.98 | 0.00 |
| M-12Wa | 1.00 | 1.00 | 1.00 | 0.00 |

2-Level TCAMs without Wide SRAMs Vs. 2-Level TCAMs with Wide SRAMs

Figure 26:
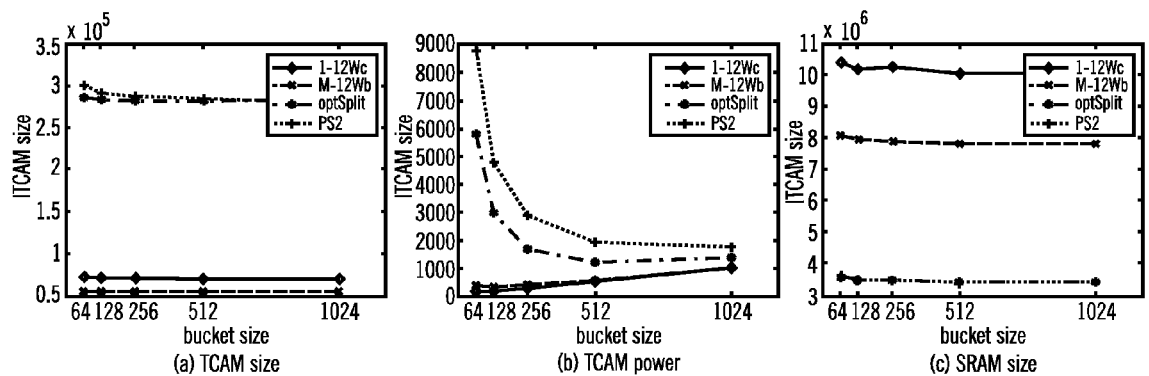
FIG. 26 is a plot illustrating total TCAM size, TCAM power, and SRAM size for AS1221, according to the present invention.

Now, the best two algorithms for 2-level TCAMs without wide SRAMS, optSplit and PS2, are compared with the two best strategies for 2-level TCAMs with wide SRAMs, 1-12Wc and M-12Wb. Tables 10, 12, and 14 show the total TCAM size, total TCAM power, and total SRAM size for each of 3 data sets using these four algorithms. FIG. 26 plots the data for AS1221. Tables 11, 13, and 15 show this data normalized by that for M-12Wb. As can be seen, in terms of total TCAM size and TCAM power, 1-12Wc and M-12Wb are significantly superior to optSplit and PS2. Both optSplit and PS2 required more than 5 times the TCAM required by M-12Wb; optSplit also required more than 6 times as much TCAM power, and PS2 required about 10 times as much TCAM power as required by the strategies employing wide SRAM. optSplit required slightly smaller total TCAM than PS2, and much less total TCAM power than PS2; both require about the same amount of SRAM. Both optSplit and PS2 require about 66% less SRAM than required by 1-12Wc and about 56% less SRAM than required by M-12Wb. Since TCAM is more expensive than SRAM and also consumes more power, the 1-12Wc and M-12Wb is recommended over optSplit and PS2.

TABLE 10

Total TCAM size

| Data Set | Algorithm | b = 64 | b = 128 | b = 256 | b = 512 | b = 1024 |
|---|---|---|---|---|---|---|
| AS1231 | 1-12Wc | 72287 | 70704 | 71193 | 69644 | 69639 |
| | M-12Wb | 55981 | 55071 | 54620 | 54314 | 54294 |
| | optSplit | 287273 | 284377 | 282945 | 282236 | 281883 |
| | PS2 | 309604 | 291236 | 287917 | 284534 | 283355 |
| AS3333 | 1-12Wc | 53381 | 52388 | 53010 | 53769 | 53301 |
| | M-12Wb | 42139 | 41460 | 41026 | 40991 | 40976 |
| | optSplit | 283262 | 214059 | 213024 | 212499 | 212237 |
| | PS2 | 225389 | 218599 | 215427 | 213948 | 213443 |
| AS4637 | 1-12Wc | 52998 | 52260 | 52498 | 53257 | 55301 |
| | M-12Wb | 41759 | 41076 | 40773 | 40485 | 40976 |
| | optSplit | 214376 | 212219 | 211167 | 210646 | 210385 |
| | PS2 | 223469 | 216780 | 213667 | 212423 | 211395 |

TABLE 11

Total TCAM size normalized by that of M-12Wb

| Algorithm | min | max | mean | standard deviation |
|---|---|---|---|---|
| 1-12Wc | 1.26 | 1.35 | 1.29 | 0.01 |
| optSplit | 5.13 | 5.20 | 5.17 | 0.01 |
| PS2 | 5.16 | 5.36 | 5.26 | 0.02 |

IPv6 Router Tables

For the IPv6 experiments, the strategy proposed in the reference M. Wang, S. Deering, T. Hain, and L. Dunn, *Non-random Generator for IPv6 Tables*, 12th Annual IEEE Symposium on High Performance Interconnects, 2004, (the teachings of which is hereby incorporated by reference in its entirety and hereinafter referred to as "Wang") is used to generate IPv6 tables from IPv4 tables. In this strategy, to each IPv4 prefix a 16-bit string comprised of 001 is prepended followed by 13 random bits. If this prepending doesn't at least double the prefix length, a sufficient number of random bits is appended so that the length of the prefix is doubled. Following this prepending and possible appending, the last bit from one-fourth of the prefixes is dropped so as to maintain the 3:1 ratio of even length prefixes to odd length observed in real router tables. Each synthetic table is given the same name as the IPv4 table from which it was synthesized.

TABLE 12

Total TCAM power

| Data Set | Algorithm | b = 64 | b = 128 | b = 256 | b = 512 | b = 1024 |
|---|---|---|---|---|---|---|
| AS1221 | 1-12Wc | 159 | 176 | 281 | 524 | 1031 |
| | M-12Wb | 365 | 287 | 348 | 554 | 1046 |
| | optSplit | 5821 | 2989 | 1685 | 1232 | 1391 |
| | PS2 | 8868 | 4766 | 2857 | 1910 | 1755 |
| AS3333 | 1-12Wc | 133 | 164 | 274 | 521 | 1029 |
| | M-12Wb | 283 | 244 | 322 | 543 | 1040 |
| | optSplit | 4358 | 2249 | 1312 | 1043 | 1293 |
| | PS2 | 6633 | 3421 | 1923 | 1468 | 1475 |
| AS4637 | 1-12Wc | 134 | 164 | 274 | 521 | 1029 |
| | M-12Wb | 278 | 244 | 325 | 549 | 1040 |
| | optSplit | 4321 | 2228 | 1304 | 1041 | 1290 |
| | PS2 | 6573 | 3404 | 1805 | 1479 | 1475 |

TABLE 13

Total TCAM power normalized by that of M-12Wb

| Algorithm | min | max | mean | standard deviation |
|---|---|---|---|---|
| 1-12Wc | 0.44 | 0.99 | 0.78 | 0.05 |
| optSplit | 1.24 | 15.95 | 6.56 | 1.49 |
| PS2 | 1.42 | 24.30 | 9.96 | 2.31 |

TABLE 14

Total SRAM size (KBytes)

| Data Set | Algorithm | b = 64 | b = 128 | b = 256 | b = 512 | b = 1024 |
|---|---|---|---|---|---|---|
| AS1221 | 1-12Wc | 1270 | 1242 | 1251 | 1224 | 1224 |
| | M-12Wb | 984 | 968 | 960 | 954 | 954 |
| | optSplit | 434 | 423 | 417 | 415 | 413 |
| | PS2 | 439 | 426 | 420 | 416 | 415 |
| AS3333 | 1-12Wc | 938 | 920 | 931 | 945 | 972 |
| | M-12Wb | 740 | 728 | 721 | 720 | 726 |
| | optSplit | 327 | 318 | 314 | 312 | 311 |
| | PS2 | 330 | 328 | 315 | 313 | 312 |
| AS4637 | 1-12Wc | 931 | 918 | 922 | 936 | 972 |
| | M-12Wb | 733 | 722 | 716 | 711 | 720 |
| | optSplit | 324 | 315 | 311 | 309 | 308 |
| | PS2 | 327 | 317 | 312 | 311 | 309 |

TABLE 15

Total SRAM size normalized by that of M-12Wb

| Algorithm | min | max | mean | standard deviation |
|---|---|---|---|---|
| 1-12Wc | 1.26 | 1.35 | 1.29 | 0.01 |
| optSplit | 0.43 | 0.44 | 0.44 | 0.00 |
| PS2 | 0.43 | 0.45 | 0.44 | 0.00 |

Figure 27:
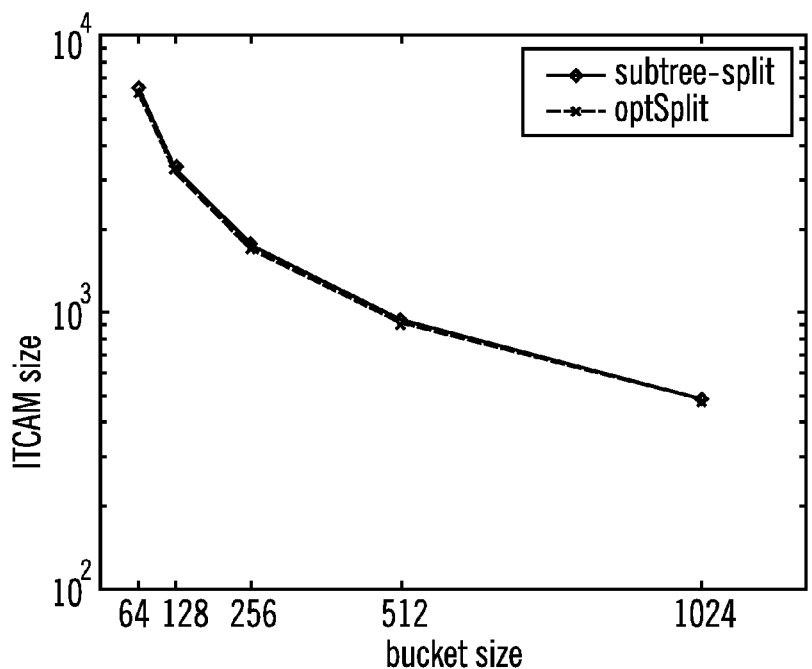
FIG. 27 is a plot illustrating total ITCAM size with wide SRAMs for IPv6 AS1221, according to the present invention.
Figure 28:
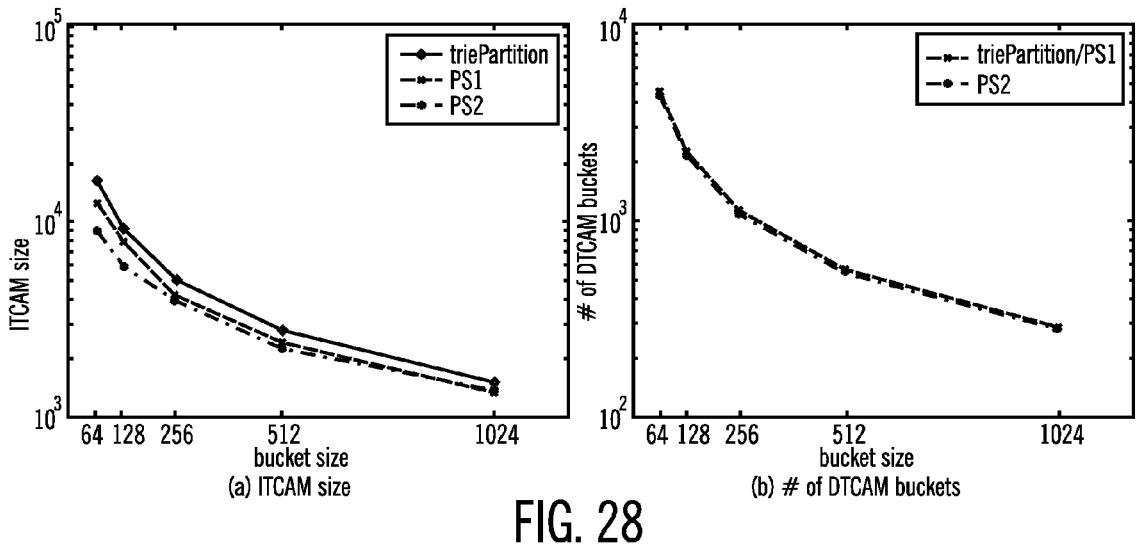
FIG. 28 is a plot illustrating total ITCAM size of DTACM bucket with wide STAMs for IPv6 AS1221, according to the present invention.
Figure 29:
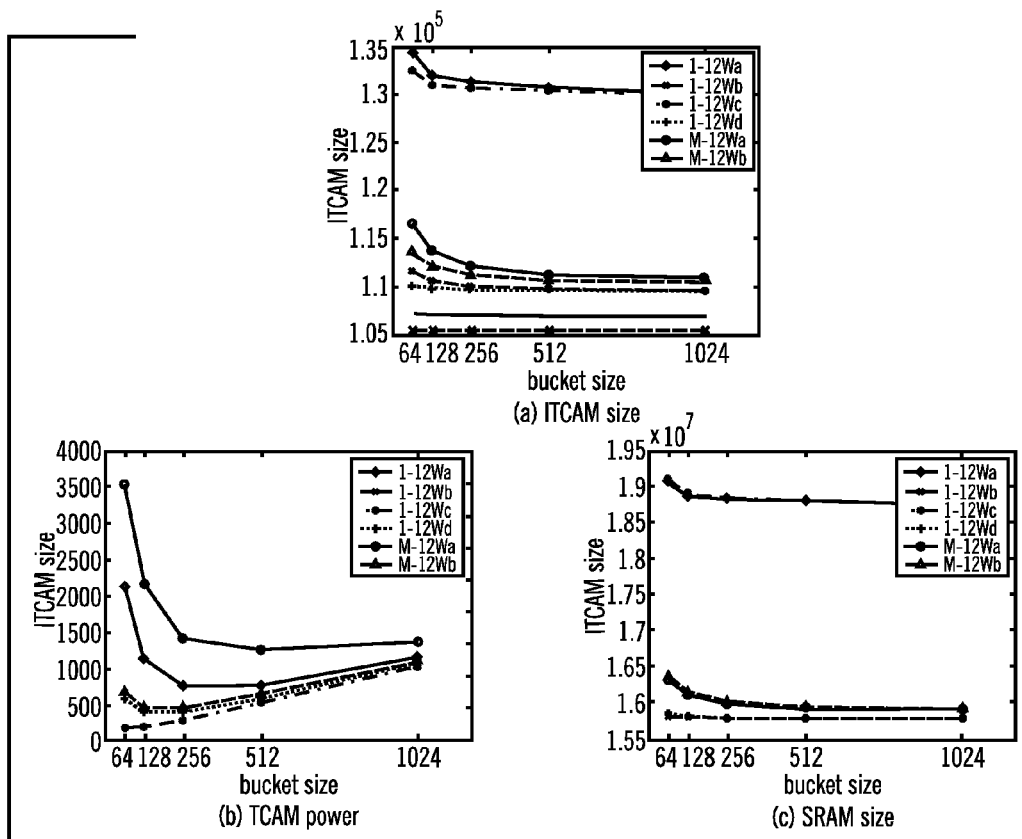
FIG. 29 is a plot illustrating total ITCAM size, Total power, and SRAM size for IPv6 AS1221, according to the present invention.

The IPv6 experiments followed the pattern of the IPv4 experiments and the results are shown in Tables 16 through 24. FIGS. 27 through 29 plot the data for AS1221. The conclusions are the same as for IPv4 data—(a) subtree-split generates solutions that are very close to optimal, (b) postorder-split required 22% to 43% larger ITCAM than triePartition with the average being 31% and the standard deviation being 7%; PS2 is better than triePartition and PS1 (the ITCAM required by triePartition solutions is 9 to 123 larger than the ITCAM required by PS2 solutions with the average being 70% and the standard deviation being 38%; the ITCAM required by PS1 was 92% to 138% that of PS2 with the average being 105% and the standard deviation being 28%; the number of ITCAM buckets generated by triePartition is 4% to 7% more than that generated by PS2 with the average and standard deviation being 3% and 1%, respectively; PS1 and triePartition generates the same number of DTCAM buckets as does postorder-split), (c) optSplit and PS2 require smaller total SRAM than required by the wide-memory strategies; however, they require more TCAM and total TCAM power, (d) 1-12Wc is recommended for 2-level TCAMs when power is the primary consideration, and (e) when total TCAM or SRAM size is of higher priority than TCAM power, M-12Wb is recommended.

TABLE 16

ITCAM size for 1-1 2-level TCAMs for IPV6

| Data Set | Algorithm | b = 64 | b = 128 | b = 256 | b = 512 | b = 1024 |
|---|---|---|---|---|---|---|
| AS1221 | subtree - split | 6482 | 3389 | 1791 | 949 | 496 |
| | optSplit | 6302 | 3300 | 1750 | 934 | 491 |
| AS3333 | subtree- split | 4225 | 2068 | 1023 | 511 | 256 |
| | optSplit | 4201 | 2058 | 1023 | 511 | 285 |
| AS4637 | subtree- split | 4220 | 2059 | 1023 | 511 | 255 |
| | optSplit | 4196 | 2057 | 1023 | 511 | 255 |

TABLE 17

ITCAM size for many-1 2-level TCAMs for IPv6

| Data Set | Algorithm | b = 64 | b = 128 | b = 256 | b = 512 | b = 1024 |
|---|---|---|---|---|---|---|
| AS1221 | triePartition | 16283 | 9233 | 5098 | 2792 | 1587 |
| | PS1 | 12410 | 8080 | 4153 | 2432 | 1340 |
| | PS2 | 9018 | 6222 | 3920 | 2241 | 1378 |
| AS3333 | triePartition | 11523 | 6316 | 3602 | 1994 | 1090 |
| | PS1 | 7146 | 3474 | 1967 | 1844 | 507 |
| | PS2 | 6674 | 3466 | 1979 | 1058 | 488 |
| AS4637 | triePartition | 11427 | 6380 | 3564 | 1987 | 1060 |
| | PS1 | 7098 | 3436 | 1886 | 1627 | 480 |
| | PS2 | 6698 | 3684 | 2052 | 1096 | 514 |

TABLE 18

Number of DTCAM buckets required for many-1 2-level TCAMs for IPv6

| Data Set | Algorithm | b = 64 | b = 128 | b = 256 | b = 512 | b = 1024 |
|---|---|---|---|---|---|---|
| AS1221 | triePartition | 4854 | 2327 | 1136 | 560 | 278 |
| | PS1 | 4854 | 2327 | 1136 | 560 | 278 |
| | PS2 | 4570 | 2256 | 1116 | 555 | 277 |
| AS3333 | triePartition | 3655 | 1752 | 855 | 422 | 210 |
| | PS1 | 3655 | 1752 | 855 | 422 | 210 |
| | PS2 | 3418 | 1686 | 837 | 417 | 208 |
| AS4637 | triePartition | 3623 | 1737 | 848 | 418 | 208 |
| | PS1 | 3623 | 1737 | 848 | 418 | 208 |
| | PS2 | 3389 | 1673 | 830 | 418 | 206 |

TABLE 19

Total TCAM size for IPv6

| Data Set | Algorithm | b = 64 | b = 128 | b = 256 | b = 512 | b = 1024 |
|---|---|---|---|---|---|---|
| AS1221 | 1-12Wa | 134615 | 132096 | 131327 | 130815 | 130175 |
| | 1-12Wb | 111767 | 110726 | 110207 | 109951 | 109823 |
| | 1-12Wc | 132673 | 131137 | 130849 | 130577 | 130057 |
| | 1-12Wd | 110223 | 109966 | 109829 | 109763 | 109729 |
| | M-12Wa | 116707 | 113909 | 112267 | 111341 | 110934 |
| | M-12Wb | 114819 | 112187 | 111300 | 110716 | 110652 |
| | optSplit | 287818 | 284816 | 283266 | 282450 | 282067 |

TABLE 19-continued

Total TCAM size for IPv6

| Data Set | Algorithm | b = 64 | b = 128 | b = 256 | b = 512 | b = 1024 |
|---|---|---|---|---|---|---|
| | PS2 | 301495 | 294990 | 289616 | 286401 | 285026 |
| AS3333 | 1-12Wa | 131040 | 131838 | 131327 | 130815 | 130175 |
| | 1-12Wb | 80509 | 79515 | 79064 | 78748 | 78620 |
| | 1-12Wc | 129153 | 139881 | 130849 | 130577 | 130057 |
| | 1-12Wd | 79017 | 78755 | 78624 | 78559 | 78526 |
| | M-12Wa | 85869 | 82658 | 81066 | 79980 | 80248 |
| | M-12Wb | 82871 | 81107 | 86075 | 79469 | 79938 |
| | optSplit | 216169 | 214026 | 212991 | 212479 | 212223 |
| | PS2 | 225126 | 219211 | 216251 | 214559 | 213480 |
| AS4637 | 1-12Wa | 130715 | 131838 | 131327 | 130815 | 130175 |
| | 1-12Wb | 79825 | 78836 | 78325 | 18069 | 77911 |
| | 1-12Wc | 128833 | 139881 | 130849 | 130577 | 130057 |
| | 1-12Wd | 78339 | 78076 | 77945 | 77879 | 77847 |
| | M-12Wa | 85181 | 82207 | 86311 | 79549 | 79141 |
| | M-12Wb | 82173 | 80463 | 79315 | 78968 | 78898 |
| | optSplit | 214415 | 212176 | 211142 | 210630 | 210374 |
| | PS2 | 223554 | 217826 | 214532 | 212551 | 211458 |

TABLE 20

Total TCAM size normalized by that of M-12Wb

| Algorithm | min | max | mean | standard deviation |
|---|---|---|---|---|
| 1-12Wa | 1.18 | 1.66 | 1.48 | 0.06 |
| 1-12Wb | 0.97 | 0.99 | 0.98 | 0.00 |
| 1-12Wc | 1.17 | 1.65 | 1.47 | 0.06 |
| 1-12Wd | 0.95 | 0.99 | 0.98 | 0.00 |
| M-12Wa | 1.00 | 1.04 | 1.01 | 0.00 |
| optSplit | 2.53 | 2.67 | 2.61 | 0.01 |
| PS2 | 2.58 | 2.72 | 2.67 | 0.01 |

TABLE 21

Total TCAM power for IPv6

| Data Set | Algorithm | b = 64 | b = 128 | b = 256 | b = 512 | b = 1024 |
|---|---|---|---|---|---|---|
| AS1221 | 1-12Wa | 2135 | 1152 | 767 | 767 | 1151 |
| | 1-12Wb | 2135 | 1152 | 767 | 767 | 1151 |
| | 1-12Wc | 193 | 193 | 289 | 529 | 1033 |
| | 1-12Wd | 591 | 392 | 389 | 379 | 1657 |
| | M-12Wa | 3555 | 2165 | 1419 | 1261 | 1366 |
| | M-12Wb | 667 | 443 | 452 | 636 | 1084 |
| | optSplit | 6366 | 3428 | 2006 | 1446 | 1515 |
| | PS2 | 9079 | 6358 | 4176 | 2753 | 2402 |
| AS3333 | 1-12Wa | 2080 | 1150 | 767 | 767 | 1151 |
| | 1-12Wb | 2080 | 1150 | 767 | 767 | 1151 |
| | 1-12Wc | 193 | 193 | 289 | 529 | 1033 |
| | 1-12Wd | 588 | 390 | 387 | 578 | 1057 |
| | M-12Wa | 3694 | 2018 | 1450 | 1132 | 1400 |
| | M-12Wb | 695 | 467 | 459 | 621 | 1090 |
| | optSplit | 4265 | 2186 | 1279 | 1023 | 1279 |
| | PS2 | 6738 | 3534 | 2235 | 1567 | 1512 |
| AS4637 | 1-12Wa | 2075 | 1150 | 767 | 767 | 1151 |
| | 1-12Wb | 2075 | 1150 | 767 | 767 | 1151 |
| | 1-12Wc | 193 | 193 | 289 | 529 | 1083 |
| | 1-12Wd | 589 | 399 | 387 | 577 | 1057 |
| | M-12Wa | 3709 | 2207 | 1463 | 1213 | 1317 |
| | M-12Wb | 701 | 463 | 467 | 632 | 1074 |
| | optSplit | 4260 | 2185 | 1279 | 1023 | 1279 |
| | PS2 | 6722 | 3812 | 2308 | 1607 | 1538 |

TABLE 22

Total TCAM power normalized by that of M-12Wb

| Algorithm | min | max | mean | standard deviation |
|---|---|---|---|---|
| 1-12Wa | 1.06 | 3.20 | 1.90 | 0.21 |
| 1-12Wb | 1.06 | 3.20 | 1.90 | 0.21 |
| 1-12Wc | 0.28 | 0.96 | 0.63 | 0.07 |
| 1-12Wd | 0.83 | 0.98 | 0.89 | 0.01 |
| M-12Wa | 1.23 | 5.33 | 3.26 | 0.43 |
| optSplit | 1.17 | 9.54 | 3.88 | 0.69 |
| PS2 | 1.39 | 14.33 | 6.43 | 1.14 |

TABLE 23

Total SRAM size (KBytes) for IPv6

| Data Set | Algorithm | b = 64 | b = 128 | b = 256 | b = 512 | b = 1024 |
|---|---|---|---|---|---|---|
| AS1221 | 1-12Wa | 2329 | 2304 | 2209 | 2295 | 2286 |
| | 1-12Wb | 1934 | 1931 | 1929 | 1929 | 1928 |
| | 1-12Wc | 2332 | 2305 | 2300 | 2295 | 2286 |
| | 1-12Wd | 1937 | 1932 | 1930 | 1929 | 1928 |
| | M-12Wa | 1995 | 1969 | 1954 | 1945 | 1944 |
| | M-12Wb | 2000 | 1972 | 1956 | 1946 | 1945 |
| | optSplit | 436 | 425 | 419 | 416 | 414 |
| | PS2 | 441 | 432 | 424 | 419 | 417 |
| AS3333 | 1-12Wa | 2268 | 2299 | 2299 | 2295 | 2286 |
| | 1-12Wb | 1386 | 1383 | 1381 | 1380 | 1380 |
| | 1-12Wc | 2270 | 2300 | 2300 | 2295 | 2286 |
| | 1-12Wd | 1388 | 1384 | 1382 | 1380 | 1380 |
| | M-12Wa | 1450 | 1422 | 1405 | 1395 | 1404 |
| | M-12Wb | 1456 | 1425 | 1407 | 1396 | 1405 |
| | optSplit | 326 | 318 | 314 | 312 | 311 |
| | PS2 | 330 | 321 | 316 | 314 | 312 |
| AS4637 | 1-12Wa | 2262 | 2299 | 2299 | 2295 | 2286 |
| | 1-12Wb | 1374 | 1371 | 1369 | 1368 | 1368 |
| | 1-12Wc | 2204 | 2300 | 2300 | 2295 | 2286 |
| | 1-12Wd | 1377 | 1372 | 1370 | 1368 | 1368 |
| | M-12Wa | 1438 | 1414 | 1392 | 1387 | 1386 |
| | M-12Wb | 1444 | 1414 | 1394 | 1388 | 1386 |
| | optSplit | 324 | 315 | 311 | 309 | 308 |
| | PS2 | 327 | 319 | 314 | 311 | 309 |

TABLE 24

Total SRAM size normalized by that of M-12Wb

| Algorithm | min | max | mean | standard deviation |
|---|---|---|---|---|
| 1-12Wa | 1.16 | 1.65 | 1.47 | 0.06 |
| 1-12Wb | 0.95 | 0.99 | 0.98 | 0.00 |
| 1-12Wc | 1.17 | 1.65 | 1.47 | 0.06 |
| 1-12Wd | 0.95 | 0.99 | 0.98 | 0.00 |
| M-12Wa | 1.00 | 1.00 | 1.00 | 0.00 |
| optSplit | 0.21 | 0.22 | 0.22 | 0.00 |
| PS2 | 0.21 | 0.23 | 0.22 | 0.00 |

Conclusion

For one aspect of the present invention provides an optimal algorithm, optSplit, for subtree splitting and shown that, in the worst case, this algorithm may generate half as many ITCAM entries (equivalently, DTCAM buckets) when partitioning a 1-bit trie as generated by the heuristic, subtree-split of the reference Zane. However, on the test data presented herein, the heuristic of the reference Zane} generated near-optimal partitions. For many-1 partitioning, the heuristic PS2 outperforms the heuristic triePartition of the reference Halu. In fact, on IPv4 data, triePartition results in 80% to 137% more ITCAM entries than generated by PS2 on the test data.

Besides improving upon existing trie partitioning algorithms for TCAMs, the present invention provides a novel way to combine TCAMs and SRAMs so as to achieve a significant reduction in power and TCAM size. This is done without any increase in the number of TCAM searches and SRAM accesses required by a table lookup! Note that regardless of whether the many-1 2-level schemes of the references of Halu and Zane are used or the recommended wide memory schemes M-12Wb and 1-12Wc developed by us, a lookup requires 2 TCAM searches and 2 SRAM accesses. However, on the IPv4 test data, M-12Wb required about 1/5th the TCAM memory and about 1/10 the TCAM power as required by the improved versions of the schemes of the references of Halu and Zane; however, M-12Wb required 2.5 times as much SRAM memory. On IPv6 data, these ratios were 2/5, 1/6, and 5, respectively. On IPv4 data, 1-12Wc required about 1/4th the TCAM memory, 1/12th as much TCAM power, and about 3 times as much SRAM memory as required by the improved versions of the schemes of the references of Halu and Zane. These ratios were, 1/2, 1/10, and 7, respectively, for IPv6 data. Since TCAM memory and power are the dominant criteria for optimization, M-12Wb is recommended when TCAM memory is optimized and 1-12Wc is recommended when power is optimize.

Non-Limiting Examples

Figure 30:
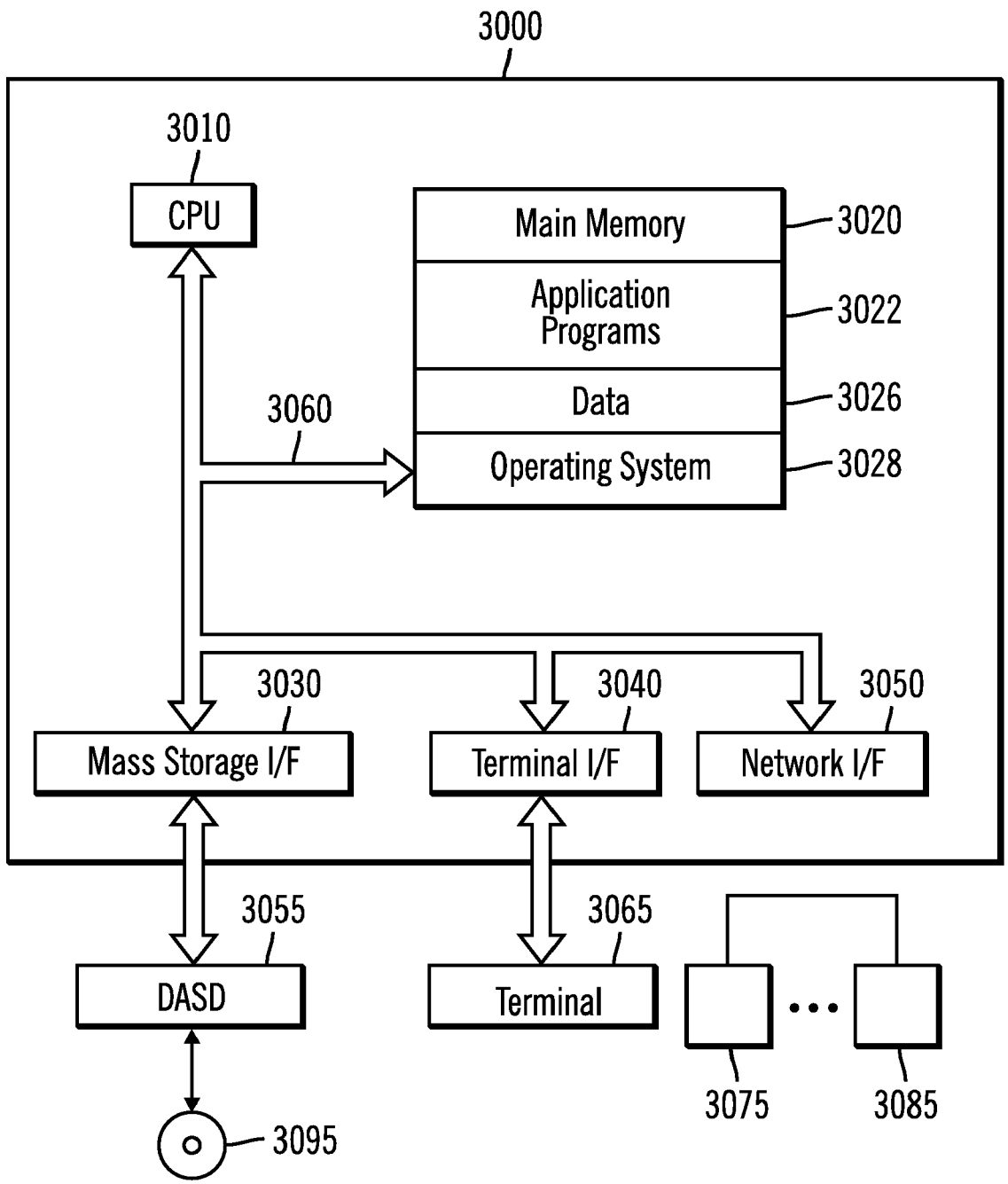
FIG. 30 is a block diagram depicting a router system, for utilizing the present invention.

The method described herein can be carried out on a hardware such as a circuit or in software or both. The hardware can be implemented as an integrated circuit chip in a router or in firmware, software or any combination thereof. FIG. 30 is a block diagram depicting an example router system, for utilizing the present invention. Processing circuits as understood in this specification include a broad range of processors, including any variety of processing circuit or computer system that is located at a single location, or distributed over several identifiable processors. These several processors are further able to be collocated or physically dispersed within a local area or a geographically widespread area. Any suitably configured processing system is also able to be used by embodiments of the present invention. The router system 3000 has a processor 3010 that is connected to a main memory 3020, mass storage interface 3030, terminal interface 3040 and network interface 3050. A system bus 3060 interconnects these system components. Mass storage interface 3030 is used to connect mass storage devices, such as DASD device 3055, to the router or computer system 3000. One specific type of DASD device is a floppy disk drive, which may be used to store data to and read data from a CD 3095 as a computer program product.

Main Memory 3020 contains application programs 3022, objects 3024, data 3026 and an operating system image 3028. Although illustrated as concurrently resident in main memory 3020, it is clear that the applications programs 3022, data 3026 and operating system 3028 are not required to be completely resident in the main memory 3020 at all times or even at the same time. Router system 3000 utilizes conventional virtual addressing mechanisms to allow programs to behave as if they have access to a large, single storage entity, referred to herein as a computer system memory, instead of access to multiple, smaller storage entities such as main memory 3020 and DASD device 3055.

Operating system 3028 is a suitable multitasking operating system. Operating system 3028 includes a DASD management user interface program to manage access through the mass storage interface 3030. Embodiments of the present invention utilize architectures, such as an object oriented framework mechanism, that allows instructions of the components of operating system 3028 to be executed on any processor within router 3000.

Although only one CPU 3002 is illustrated for computer 3002, computer systems with multiple CPUs can be used equally effectively. Embodiments of the present invention incorporate interfaces that each include separate, fully programmed microprocessors that are used to off-load processing from the CPU 3002. Terminal interface 3008 is used to directly connect one or more terminals 3018 to router system 3000. These terminals 3018, which are able to be non-intelligent or fully programmable workstations, are used to allow system administrators and users to communicate with router system 3000.

Network interface 3050 is used to connect other computer systems or group members, e.g., Station A 3075 and Station B 3085, to router system 3000. The present invention works with any data communications connections including present day analog and/or digital techniques or via a future networking mechanism.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for routing a packet, the method comprising:
   storing, using a suffix node format, a subtree of an ordered tree data structure into a given word size of random-access memory (RAM), wherein the suffix node format comprises one or more data structures that at least represents a set of internet protocol prefixes with common leading bits, wherein the RAM is logically partitioned into a first portion with suffix nodes associated with groupings of subtree splits in at least one ternary content-addressable memory (TCAM), and a second portion for storing suffix nodes to determine the next action to perform on a packet;
   storing indices to the subtree in RAM into the TCAM;
   receiving a packet with at least one destination address;
   using a portion of the destination address to perform a lookup in the TCAM to retrieve an index value;
   indexing the RAM to retrieve the subtree corresponding to the index value; and
   using the subtree which has been retrieved to determine a next action to perform on the packet.

2. The method of claim 1, wherein the next action to perform on the packet is finding a next hop for forwarding the packet.

3. The method of claim 1, wherein the next action to perform on the packet is classifying the packet.

4. The method of claim 3, wherein the next action to perform on the packet is classifying whether the packet is an intrusion packet.

5. The method of claim 1, wherein the suffix node format includes a suffix count, a suffix length and a suffix of a next hop for packet routing.

6. The method of claim 1, wherein the subtree is a partition including one or more nodes of a trie representing prefixes for destination addresses.

7. The method of claim 1, wherein the RAM is static-random-access-memory (SRAM) and the given word size is a positive integer multiple n of 8 bits.

8. The method of claim 1, wherein the storing of the subtree of the ordered tree data structure into the given word size of random-access memory (RAM) includes storing the subtree of the ordered tree data structure in a logical word that is distributed over two or more physical RAMs.

9. A method for routing a packet, the method comprising:
storing, using a suffix node format, a subtree of an ordered tree data structure into a given word size of random-access memory (RAM), wherein the suffix node format comprises one or more data structures that at least represents a set of internet protocol prefixes with common leading bits;
storing a first portion of indices to the subtree in RAM into at least a first portion of at least one ternary content-addressable memory (TCAM), wherein the first portion of the TCAM is logically divided into a given number of groupings of subtree splits;
storing a second portion of indices to the indices in the first portion of the TCAM into at least a second portion of the TCAM
receiving a packet with at least one destination address;
using the destination address to perform a lookup in the second portion of the TCAM to retrieve a first index value to be used with the first portion of the TCAM;
using a combination of the first index value and the size of groupings of subtree splits to determine a location of one of the groupings of subtree splits to be searched with the destination address to retrieve a second index value into the RAM;
indexing the RAM to retrieve the subtree corresponding to the second index value; and
using the subtree which has been retrieved to determine a next action to perform on the packet.

10. The method of claim 9, wherein the size of groupings of subtree splits is b and each grouping of the subtree split has at least [b/2] entries where b>1 is a specified bound on the size of groupings and wherein the groupings are created using an optimal splitting algorithm.

11. The method of claim 9, wherein the RAM is logically partitioned into a first portion with prefixes for determining a location of one of the groupings of subtree splits in the first portion of TCAM to be searched and a second portion for storing information to determine the next action to perform on the packet.

12. The method of claim 9, wherein the RAM is logically partitioned into a first portion with suffix nodes used to determine a location of one of the groupings of subtree splits in the first portion of TCAM and a second portion for storing suffix nodes to determine the next action to perform on the packet.

13. The method of claim 10, wherein a set of buckets in the first portion of the TCAM are variable in size.

14. The method of claim 9, further comprising:
placing one or more forwarding-table prefixes in the subtree into the first portion of the TCAM by packing several subtries carved from an original 1-bit trie into a single one of the grouping of subtree splits.

15. The method of claim 9, further comprising:
using a dynamic programming carving algorithm to define a partial subtree, PT(N), to be a feasible subtree of a trie T that is rooted at a node N of T, where a feasible subtree of T is any subtree of T that is a result of any possible carving sequence performed on T, and where P indicates a partial subtree,
where Opt(N,b,p) is a minimum number of a set of suffix nodes in any carving of ST(N) when all but one of the subtrees represented by the set of suffix nodes are carved out of ST(x), a partial subtree PT(N) is left, such that since every suffix node in the set of suffix nodes contains at least one forwarding-table prefix, every carved subtree, other than PT(N), contains at least one forwarding-table prefix,
wherein ST(x) is a subtree of T that is rooted at x, where x is a node of T and S indicates a subtree, and
wherein p is a number of prefixes in PT (N), and b is a number of bits required for storing at least one of suffix lengths, suffixes, and next hops for prefixes of PT(N)'.

16. A system for routing a packet, the system comprising:
a storage medium capable of storing data;
a processor in communication with said storage medium, said processor capable of executing a machine readable instruction for performing the method of:
storing, using a suffix node format, a subtree of an ordered tree data structure into a given word size of random-access memory (RAM), wherein the suffix node format comprises one or more data structures that at least represents a set of internet protocol prefixes with common leading bits;
storing indices to the subtree in RAM into at least one ternary content addressable memory (TCAM);
receiving a packet with at least one destination address;
using a portion of the destination address to perform a lookup in the TCAM to retrieve an index value;
indexing the RAM to retrieve the subtree corresponding to the index value;
and using the subtree which has been retrieved to determine a next action to perform on the packet; and
using a dynamic programming carving algorithm to define a partial subtree, PT(N), to be a feasible subtree of a trie T that is rooted at a node N of T, where a feasible subtree of T is any subtree of T that is a result of any possible carving sequence performed on T, and where P indicates a partial subtree,
where Opt(N,b,p) is a minimum number of a set of suffix nodes in any carving of ST(N) when all but one of the subtrees represented by the set of suffix nodes are carved out of ST(x), a partial subtree PT(N) is left, such that since every suffix node in the set of suffix nodes contains at least one forwarding-table prefix, every carved subtree, other than PT(N), contains at least one forwarding-table prefix,
wherein ST(x) is a subtree of T that is rooted at x, where x is a node of T and S indicates a subtree, and
wherein p is a number of prefixes in PT (N), and b is a number of bits required for storing at least one of suffix lengths, suffixes, and next hops for prefixes of PT(N).

17. The system of claim 16, wherein the next action to perform on the packet is finding a next hop for forwarding the packet.

18. The system of claim 16, wherein the next action to perform on the packet is classifying the packet.

19. The system of claim 18, wherein the next action to perform on the packet is classifying whether the packet is an intrusion packet.

20. A computer program product for routing a packet, the computer program product comprising:
a non-transitory computer-usable storage storing instructions that, when executed on a computer, cause the computer to perform a method comprising:
storing, using a suffix node format, a subtree of an ordered tree data structure into a given word size of random-access memory (RAM), wherein the suffix node format comprises one or more data structures that at least represents a set of internet protocol prefixes with common leading bits, wherein the RAM is logically partitioned into a first portion with suffix nodes associated with groupings of subtree splits in at least one ternary content-addressable memory (TCAM), and a second portion for storing suffix nodes to determine the next action to perform on a packet;
storing indices to the subtree in RAM into the TCAM;
receiving a packet with at least one destination address;
using a portion of the destination address to perform a lookup in the TCAM to retrieve an index value;
indexing the RAM to retrieve the subtree corresponding to the index value; and
using the subtree which has been retrieved to determine a next action to perform on the packet.

* * * * *